United States Patent [19]

Igashira et al.

[11] Patent Number: 4,748,954
[45] Date of Patent: Jun. 7, 1988

[54] ELECTROSTRICTIVE ACTUATOR DEVICE AND FUEL INJECTION DEVICE USING SAME

[75] Inventors: Toshihiko Igashira, Toyokawa; Yasuyuki Sakakibara, Nishio; Seiko Abe, Okazaki; Kiyonori Sekiguchi, Nukata; Akihiro Izawa, Nishio; Hisasi Kawai, Toyohashi, all of Japan

[73] Assignee: Nippon Soken, Inc., Nishio, Japan

[21] Appl. No.: 754,750

[22] Filed: Jul. 15, 1985

[30] Foreign Application Priority Data

Jul. 16, 1984 [JP] Japan ................. 59-14778
Dec. 12, 1984 [JP] Japan ................. 59-260639
Mar. 27, 1985 [JP] Japan ................. 60-62270
Apr. 15, 1985 [JP] Japan ................. 60-79718
May 30, 1985 [JP] Japan ................. 60-115281

[51] Int. Cl.$^4$ ............................ F02M 39/00
[52] U.S. Cl. ........................... 123/494; 123/498; 123/496; 123/300; 73/119 A
[58] Field of Search ............. 123/494, 299, 300, 496, 123/504, 498, 506; 73/119 A

[56] References Cited

U.S. PATENT DOCUMENTS

| 3,465,732 | 9/1969 | Kattchee | 123/498 |
| 3,803,424 | 4/1974 | Smiley | 123/498 |
| 4,029,071 | 6/1977 | Saito | 123/496 |
| 4,537,171 | 8/1985 | Kuroyanagi | 123/506 |

FOREIGN PATENT DOCUMENTS

| 0015665 | 1/1984 | Japan | 123/496 |
| 0012131 | 1/1984 | Japan | 123/496 |
| 59-18249 | 1/1984 | Japan | |
| 59-49740-(U) | 4/1984 | Japan | |

OTHER PUBLICATIONS

English Abstract, Japanese Unexamined Patent Publication No. 59-18249, (1/30/84).
U.S. Patent Application No. 533812, Yasuyuki Sakakibara et al., filed Sep. 19, 1983.
U.S. Patent Application (Filed May 6, 1985), Mitiyasu Moritugu et al., Ser. No. 730,580.

Primary Examiner—Carl Stuart Miller
Attorney, Agent, or Firm—Cushman, Darby & Cushman

[57] ABSTRACT

An electrostrictive actuator which can be used, e.g., in a distributor type fuel injection device of a diesel engine has an electrostrictive actuator for generating an electric charge upon reception of a load and an electric circuit unit connected to the electrostrictive actuator. The electric circuit unit has an electric charge changing means for changing the electric charge of the electrostrictive actuator in the state of generation of electric charge due to a load exerted on the electrostrictive actuator and thereby constricting the electrostrictive actuator, and an electrical charging means for charging the electrostrictive actuator in the state of constriction due to the operation of the electric charge changing means when the load exerted on the electrostrictive actuator is reduced and thereby extending the electrostrictive actuator.

21 Claims, 38 Drawing Sheets

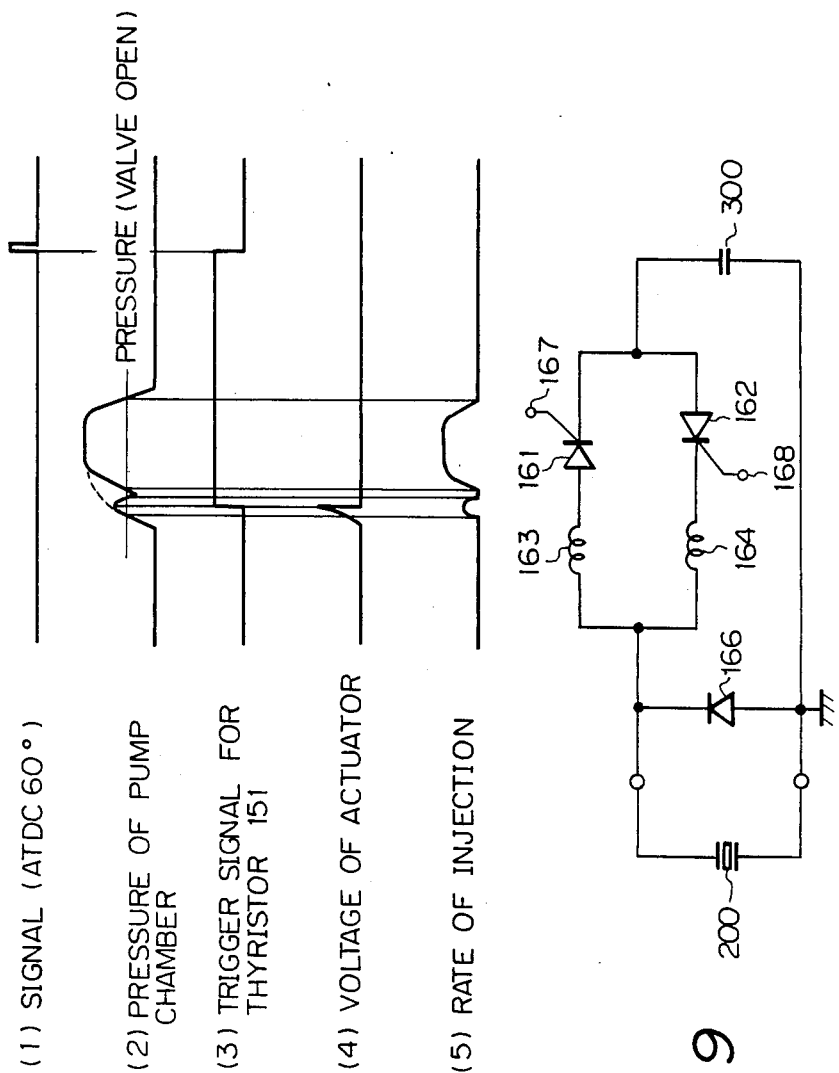

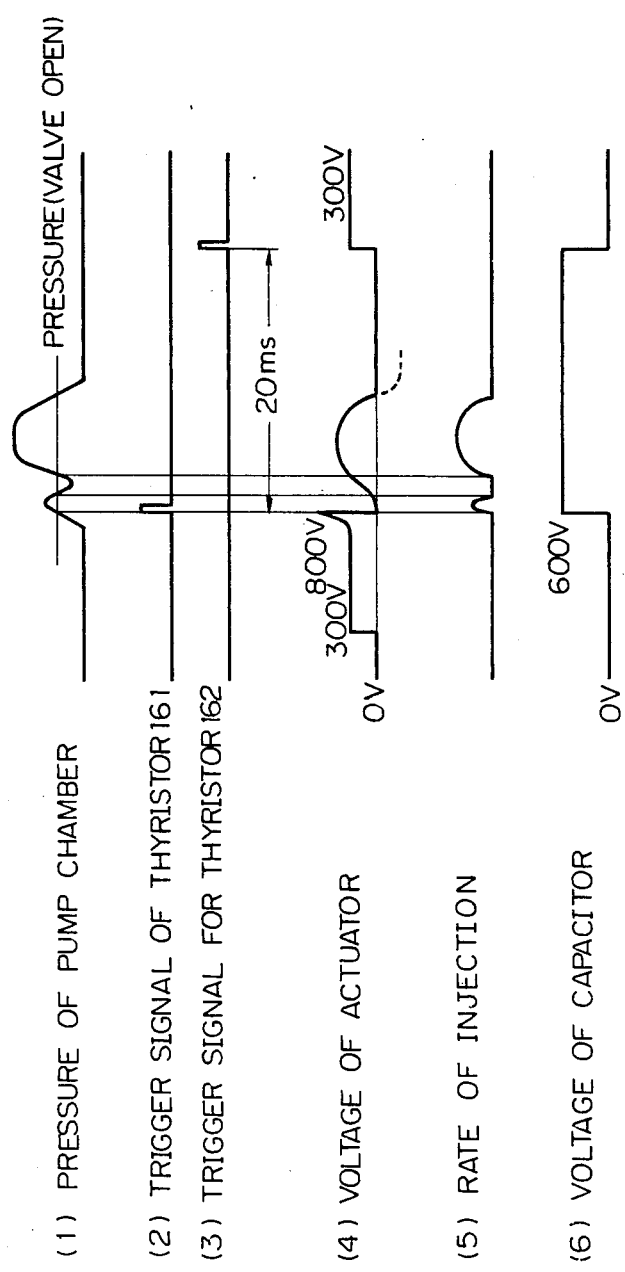

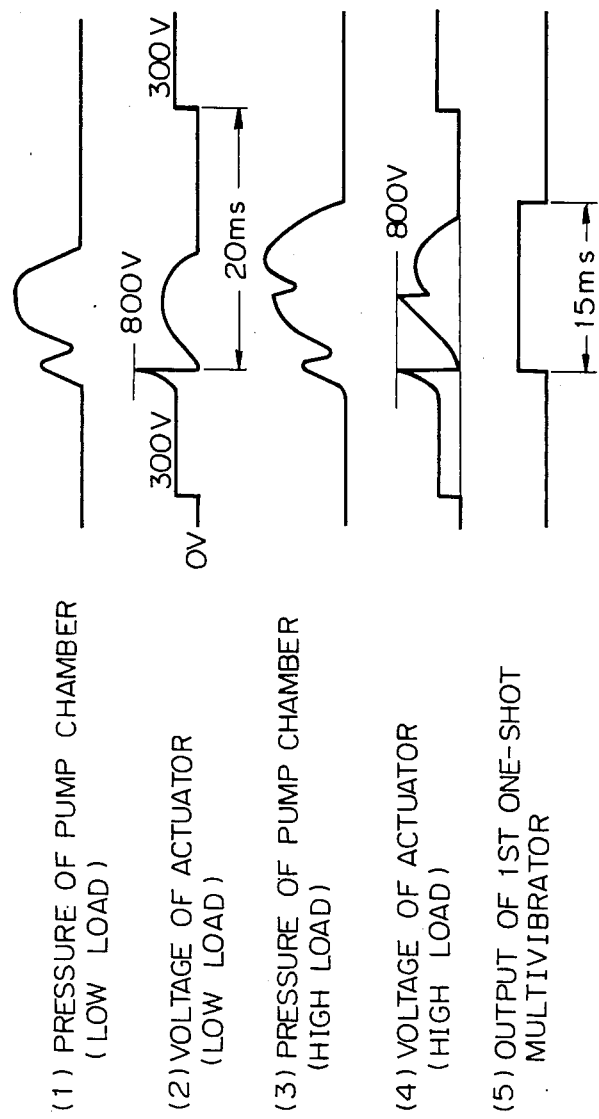

INTERRUPTION ROUTINE

NON-IDLING CASE

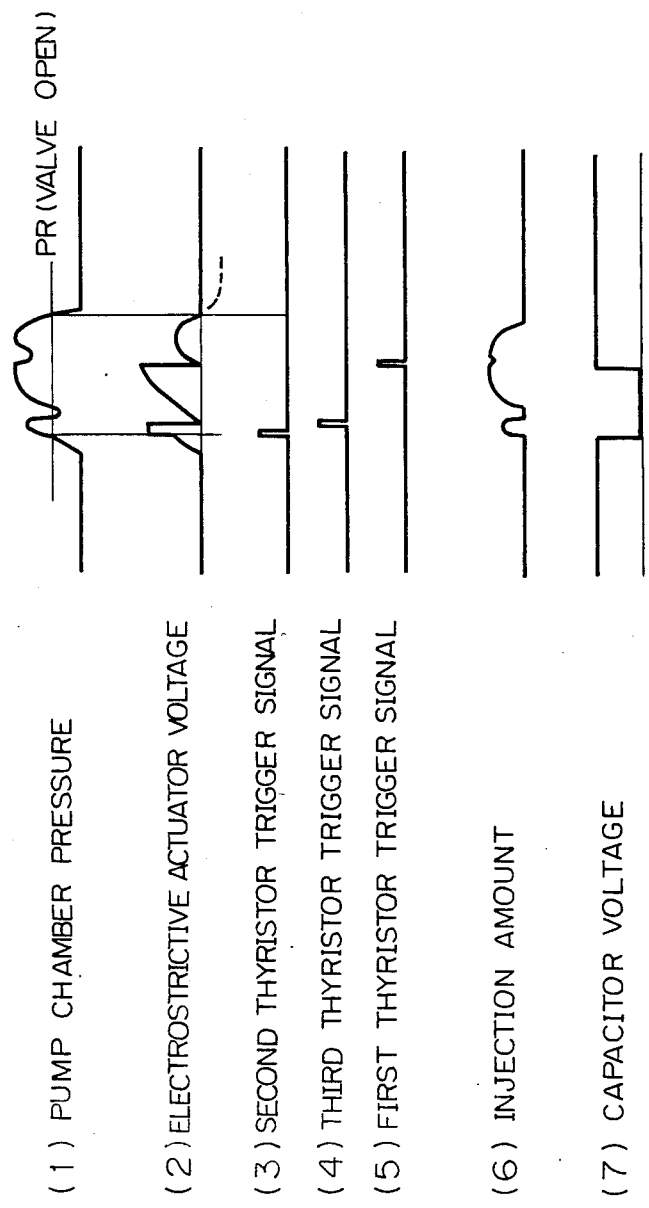

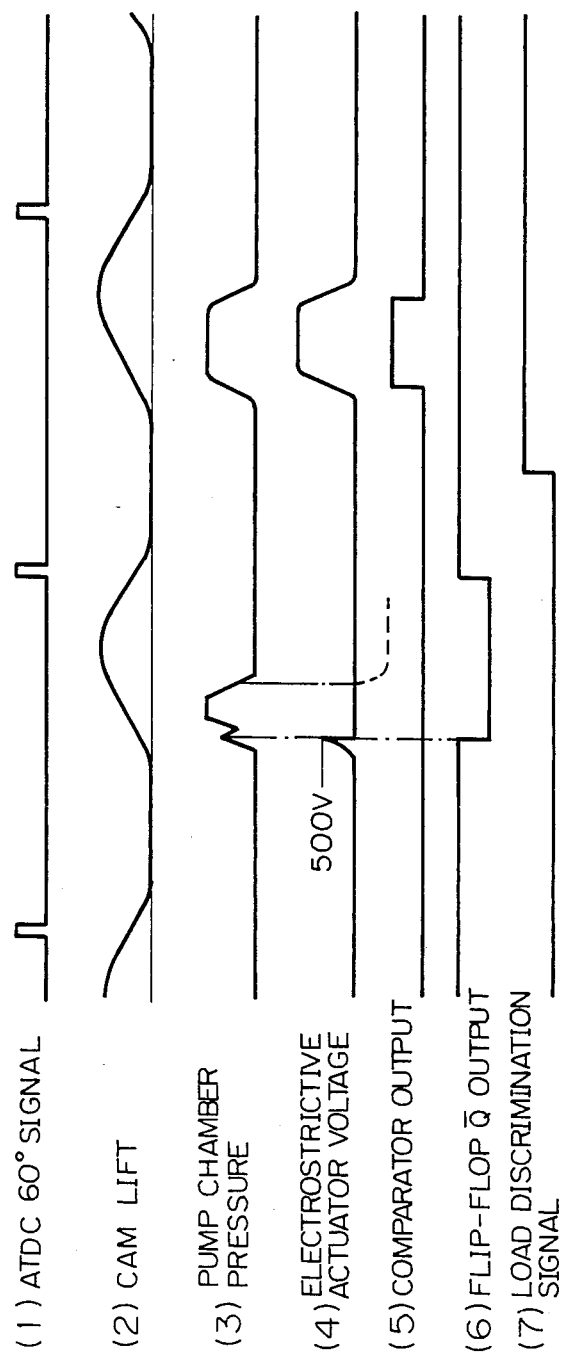

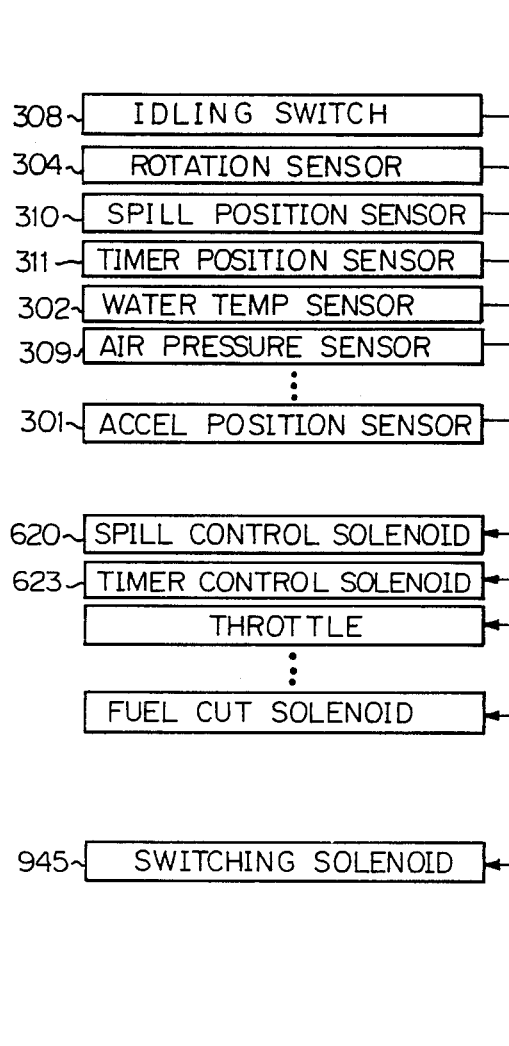

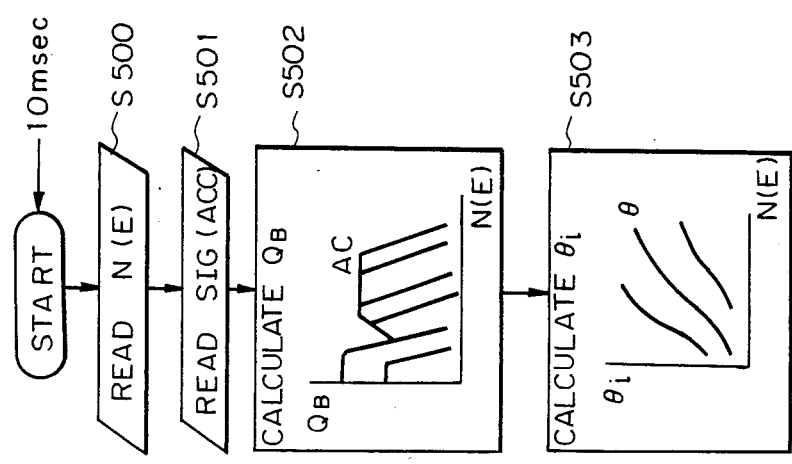

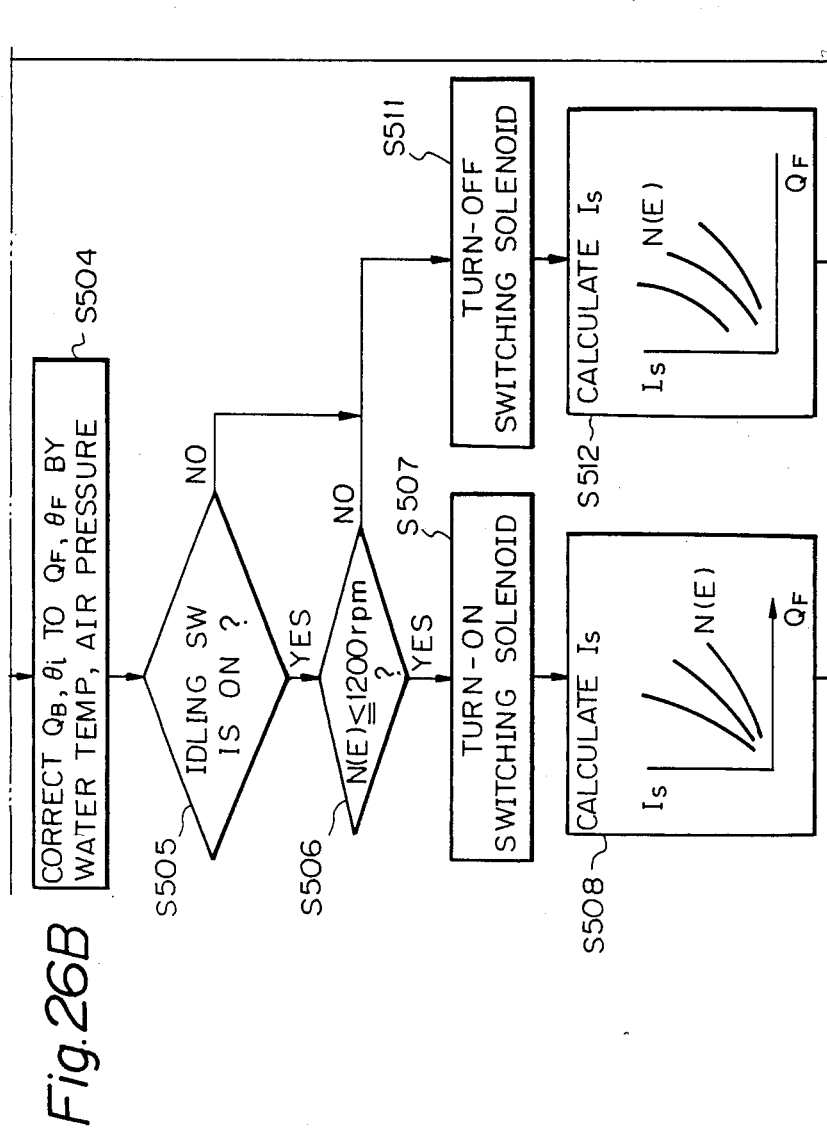

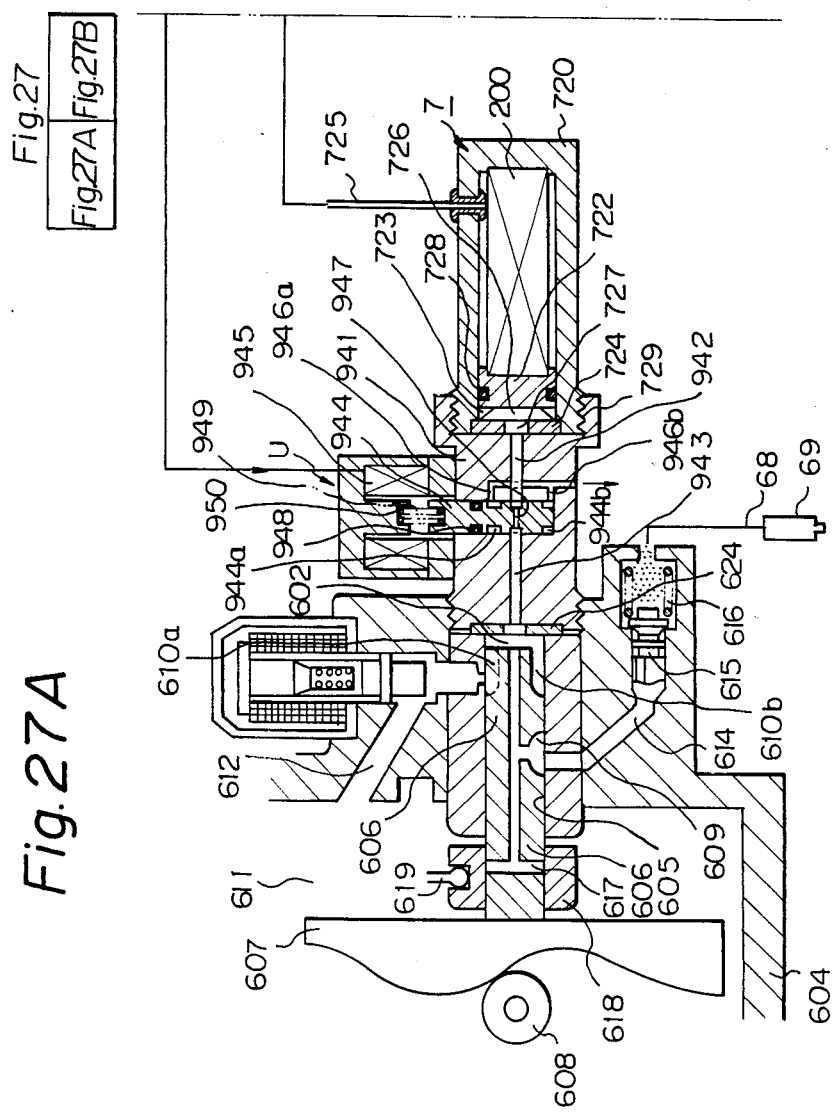

Fig. 38
Fig. 40
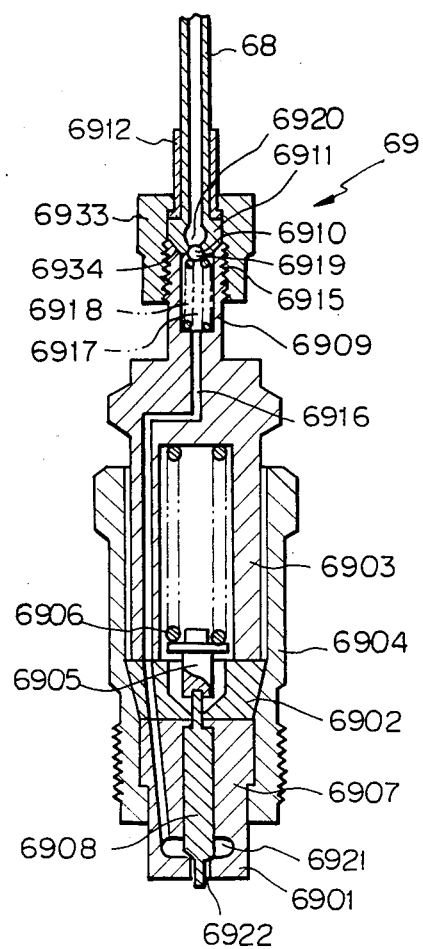
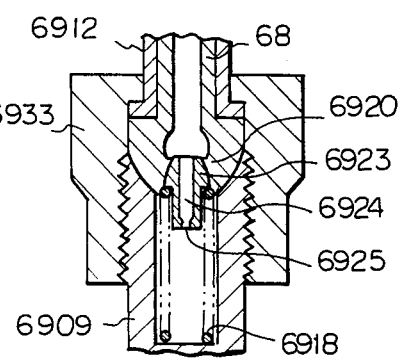

ELECTROSTRICTIVE ACTUATOR DEVICE AND FUEL INJECTION DEVICE USING SAME

BACKGROUND OF THE INVENTION

1. Field of the Invention

The present invention relates to an electrostrictive actuator device and a fuel injection device for a diesel engine using the same.

2. Description of the Related Art

Generally, an electrostrictive actuator constituted by stacking a number of piezoelectric element sheets is driven by the external application of a high voltage.

For example, an electrostrictive actuator device is proposed wherein within a pressure chamber communicating with a fuel injection pump chamber and housing a piston driven in accordance with an applied voltage is provided, and a fuel injection rate is controlled in accordance with operating conditions of an engine (see: Japanese Unexamined Patent Publication (Kokai) No. 5918249). In this case, since a high DC voltage is required, the power source circuit becomes complex and expensive when the device is mounted on a vehicle.

SUMMARY OF THE INVENTION

It is an object of the invention to realize a striction driving of an electrostrictive actuator by discharging the electric charge generated in the electrostrictive actuator in the state where an external force is applied thereto.

It is another object of the present invention to realize an electrostrictive actuator device which can achieve a large extension/constriction amount without using a high voltage power source, based upon the fact that an electric charge generated in an electrostrictive actuator is first transferred else is then returned.

It is still another object of the present invention to protect, in a fuel injection device using an electrostrictive element actuator, a piezoelectric element in the electrostrictive element actuator from damage, thereby preventing a decrease in a fuel injection rate due to constriction of the piezoelectric element in accordance with a pressure load.

It is a further object of the present invention to effectively operate a fuel injection device for a diesel engine only under a predetermined driving condition, so that diesel engine noise under a predetermined driving condition, e.g., in an idling mode, is reduced.

BRIEF DESCRIPTION OF THE DRAWINGS

FIG. 8 is a waveform chart for explaining the operational characteristics of the electrostrictive actuator;

FIG. 9 is a circuit diagram showing an arrangement of a drive circuit of the electrostrictive actuator;

FIG. 10 is a waveform chart for explaining the operational characteristics of the circuit shown in FIG. 9;

FIG. 11 is a waveform chart for explaining the operational characteristics of the circuit shown in FIG. 6;

Figs. 13, 14, 14A, 14B, 14C, and 15 are flow charts showing an operation of the system shown in FIG. 1;

FIG. 21 is a waveform chart for explaining the operational characteristics of the circuit shown in FIG. 20;

FIG. 24 is a waveform chart for explaining the operational characteristics of the circuit shown in FIG. 23;

FIGS. 25, 25A and 25B are a block diagram showing a control circuit applied to the device shown in FIG. 22;

FIGS. 26, 26A, 26B and 26C are a flow chart showing an operation of the circuit shown in FIG. 25;

FIGS. 27, 27A and 27B are a sectional view showing a fuel injection pump using the electrostrictive actuator according to still another embodiment of the present invention;

FIG. 38 is a sectional view showing an arrangement of a fuel injection valve according to still another embodiment of the present invention;

FIG. 40 is a sectional view showing an example of a portion of the fuel injection valve according to still another embodiment of the present invention.

DESCRIPTION OF THE PREFERRED EMBODIMENTS

Figure 1:
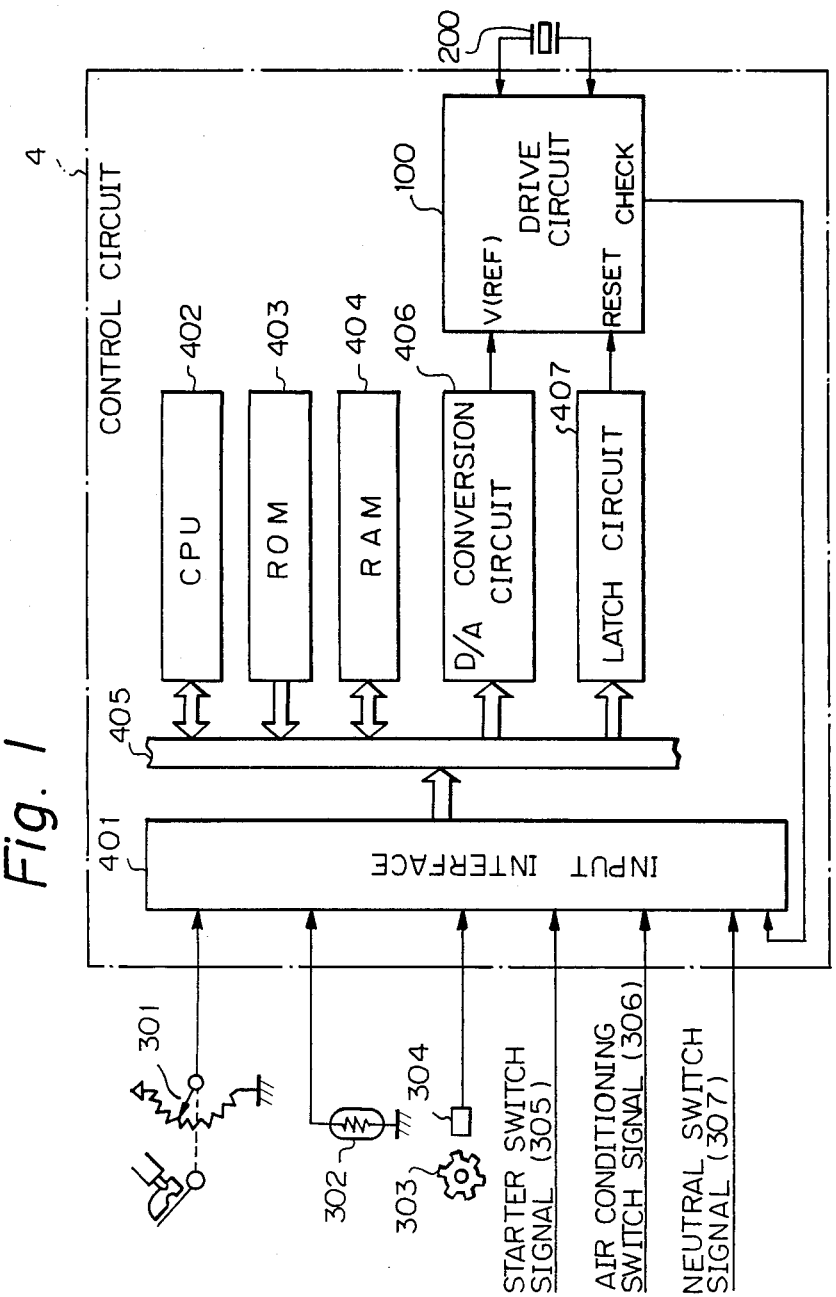
FIG. 1 is a view showing a schematic arrangement of a control system of an electrostrictive actuator device according to an embodiment of the present invention.

FIG. 1 shows a control system of an electrostrictive actuator device according to an embodiment of the present invention.

Figure 2:
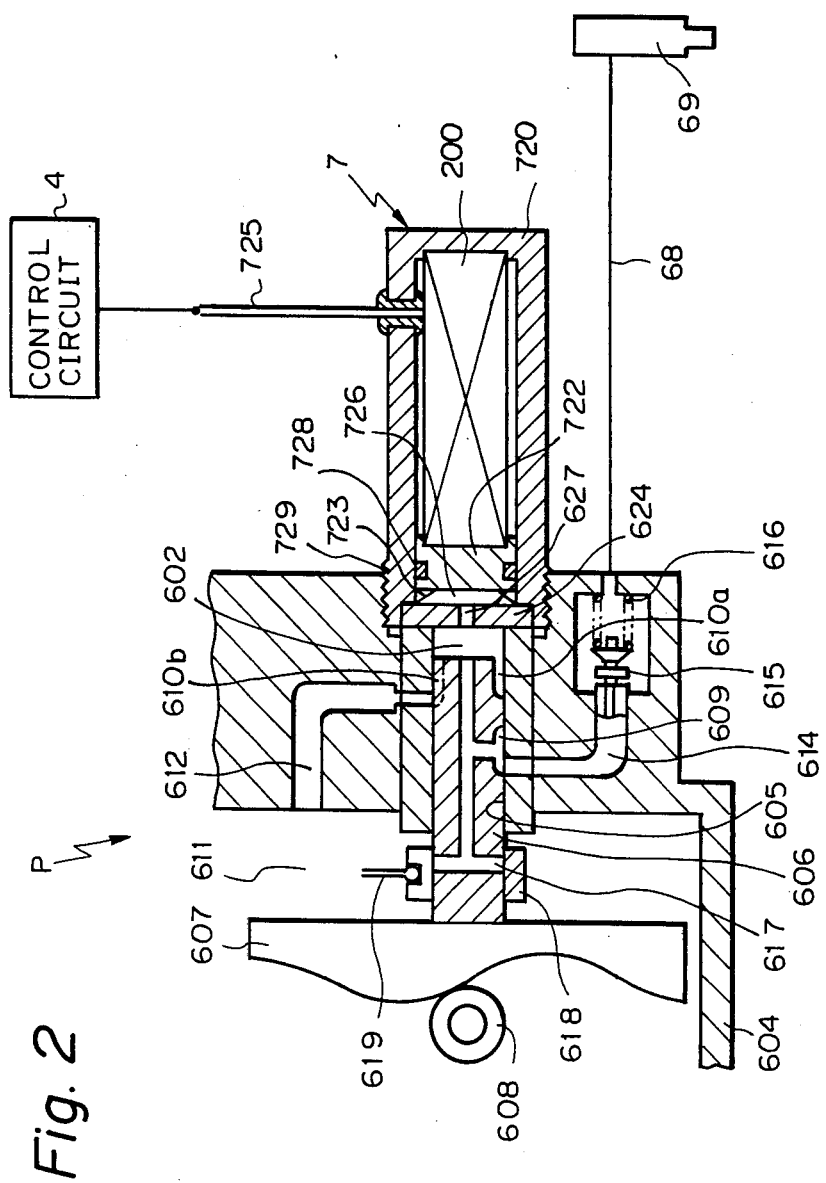
FIG. 2 is a sectional view showing an arrangement in which the system shown in FIG. 1 is applied to a fuel injection pump.

FIG. 2 shows an arrangement in which the system shown in FIG. 1 is applied to a distributor type fuel injection pump, wherein an injection rate control device 7 is directly coupled to a pump chamber 602 of a distributor type fuel injection pump P.

Arrangement and Operation of Fuel Injection Pump

A plunger 606 slidably supported in a cylinder bore 605 of a casing 604 of the fuel injection pump P is rotated and reciprocated in synchronism with a half revolution of an engine. When rotation of the engine is transmitted to a drive shaft through a gear or a timing belt, the plunger 606 is coaxially rotated by the drive shaft. When a face cam 607 is engaged with a roller 608, the plunger 606 is reciprocated. The face cam 607 is continuously biased to the left by a spring (not shown) in FIG. 2 to be engaged with the roller 608, and the plunger 606 is reciprocated when the roller 608 is rotated about its center axis along a cam surface of the face cam 607. A single distribution port 609 and intake ports 610a and 610b corresponding in number to the number of engine cylinders are formed in the outer periphery of the plunger 606. The pump chamber 602 is formed between a distal end face of the plunger 606 and the cylinder bore 605.

In the casing 604, a low pressure chamber 611, an intake path 612 for communicating the low pressure chamber 611 with the cylinder bore 605, and distribution paths 614 communicating external injection valves 69 with the cylinder bore 605 are formed. The distribution paths 614 correspond in number to the number of engine cylinders, and delivery valves 615 are provided in the respective paths 614. Each delivery valve 615 can be released against a biasing force of a spring 616, thus serving both as check and retraction valves.

When the plunger 606 moves to the left and the pump chamber 602 is expanded, one of the intake ports 610 communicates with the intake paths 612 and fuel in the low pressure chamber 611 is taken into the pump chamber 602. In contrast to this, when the plunger 606 moves to the right and the pump chamber 602 is contracted, the distribution port 609 communicates with one of the distribution paths 614 and the fuel in the pump chamber 602 is externally supplied. The fuel supply is started when the plunger 606 begins to move to the right and ends when the plunger 606 moves further to the right and a spill port 617 is released inside the low pressure chamber 611 from a right end face of a spill ring 618.

Note that the spill port 617 is an opening which is provided in the plunger 606 and communicates the pump chamber 602 with the low pressure chamber 611. The spill ring 618 has a short cylindrical shape and the plunger 606 is slid in an inner hole thereof. The fixed position of the spill ring 618 can be changed by a lever 619, and a delivery amount from the pump chamber 602 can be varied in accordance with the position of the spill ring 618. The lever 619 is indirectly interlocked with an accelerator pedal. The above arrangement is known to those skilled in the art.

Arrangement and Operation of Electrostrictive Actuator and Fuel Injection Control Device The fuel injection rate control device 7 is constituted by housing an electrostrictive actuator 200, a piston 722, a belleville spring 723, and a distance piece 624 in a casing 720, in order from the right in FIG. 2. The casing 720 has a cylindrical shape with a bottom, and is fixed to the fuel injection pump P by a male screw 729 provided at its open-end portion.

In the electrostrictive actuator 200, about 50 thin disk-shaped electrostrictive elements, e.g., having a diameter of 15 mm and a thickness of 0.5 mm, are stacked so as to form a cylindrical shape. Each electrostrictive element is made of a ceramic material, i.e., so-called PZT, and comprises lead zirconate/titanate as a major component thereof. If a voltage of about 500 V is applied in a thickness direction of an electrostrictive element, an extension of about 0.5 $\mu$m occurs. Note that extension herein means a positive change in length in a lengthwise direction. When 50 piezoelectric elements are stacked and 500 V voltage is applied thereto in the thickness direction of the stack, a total extension of about 25 $\mu$m can be obtained. If the applied voltage is turned off or a small negative voltage is applied, a constriction of 25 $\mu$m occurs and the element returns to its original length. Note that herein constriction means a negative change in length in a lengthwise direction.

Figure 3:
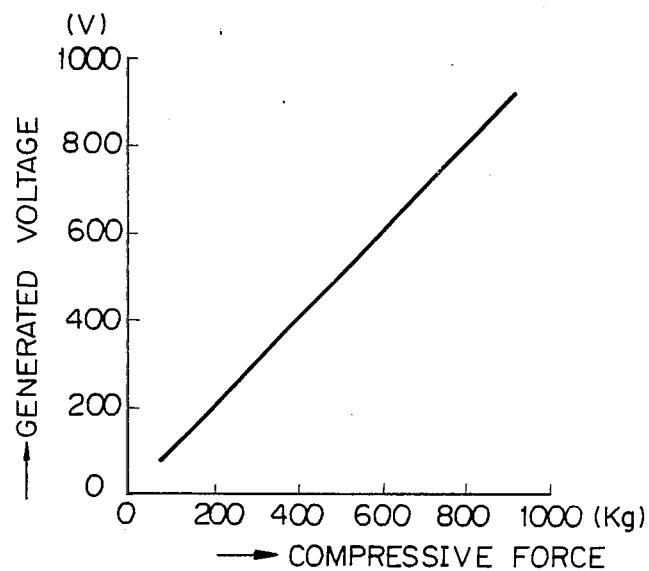
FIGS. 3 and 4 are respectively graphs showing characteristics of an electrostrictive actuator.

When a compression force is applied to the electrostrictive actuator 200 along the axial direction thereof, a voltage as shown in FIG. 3 is generated in each electrostrictive element. That is, if a 500 kg compression force is applied, a 500 V voltage is generated. The characteristics of electrostrictive elements and electrostrictive actuators are known to those skilled in the art.

Figure 4:
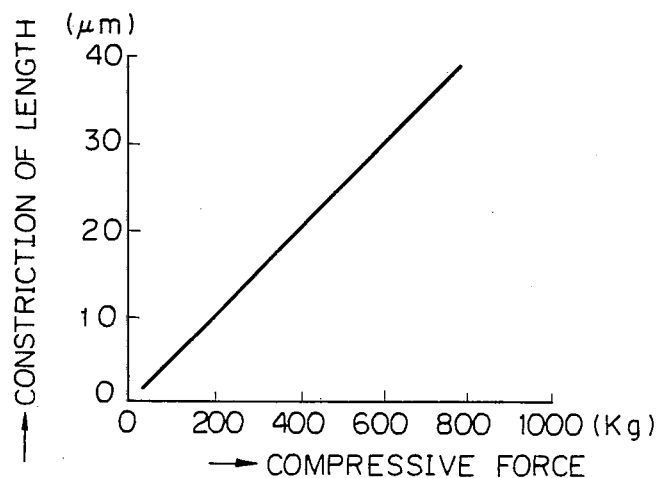

When electrodes of the electrostrictive actuator 200 are short-circuited, the electrostrictive actuator exhibits a total axial constriction showing in FIG. 4. When a 500 kg compression force is applied to the piston 722 and the electrodes of the electrostrictive element are short-circuited, a constriction of 25 $\mu$m occurs.

The operations such as voltage application, short-circuiting and open circuiting at predetermined timings are controlled by an external control circuit 4 through a lead wire 725.

The extension/constriction of the electrostrictive actuator 200 is transmitted to the piston 722, thus expanding or constricting a variable volume chamber 726 which is defined by the piston 722, the distance piece 624 and the casing 720. The belleville spring 723 is located in the variable volume chamber 726 and biases the electrostrictive actuator 200 toward its constricting direction.

The distance piece 624 has a disk shape, and has a through hole 627 at its center. The diameter of the distance piece 624 is larger than the piston 722, and when the male screw 729 of the casing 720 is turned, the distance piece 624 is sandwiched between the casing 720 and the casing 604, thus providing a seal. The variable volume chamber 726 communicates with the pump chamber 602 through the through hole 627.

An O-ring 728 is arranged on the peripheral surface of the piston 722 so that pressure in the variable volume chamber 726 does not leak through the piston 722 to the electrostictive actuator 200 side.

Figure 5:
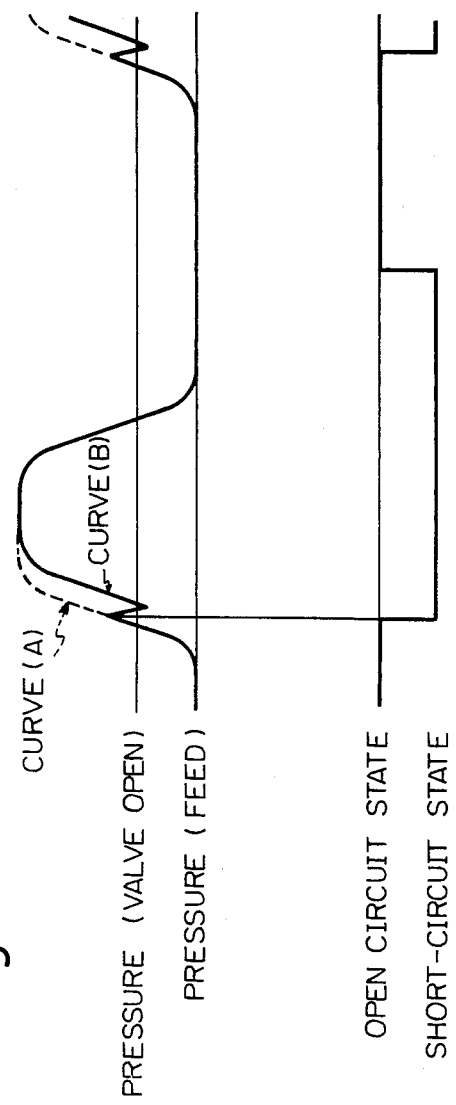
FIG. 5 is a timing chart showing pressure characteristics in the fuel injection pump.

The operation of the device shown in FIG. 2 will be described. When no external voltage is applied to the electrostrictive actuator 200 and the electrodes thereof are not short-circuited, i.e., when the electrostrictive actuator is electrically open-circuited, the pressure in the pump chamber 602 is represented by an upper curve (A) shown in FIG. 5 with reference to a feed pressure PRESSURE (FEED). A projecting portion in FIG. 5 represents an injection step. In other words, in this state, the plunger 606 is moving to the right and the spill port 617 is covered by the spill ring 618. In FIG. 5, a portion higher than a valve opening pressure PRESSURE (VALVE OPEN) of the injection valve 69 is contributed to injection. That is, during this interval, the injection valve 69 is open and its valve opening lift is proportional to the valve opening pressure. Therefore, the injection amount is also approximately proportional to the valve opening pressure.

In the electrostrictive actuator 200, an electric charge proportional to the pressure of the pump chamber 602 is generated, and voltage shown in FIG. 3 is generated. Note that in order to convert the pressure in the pump chamber 602 into the compression force of FIG. 3, the pressure receiving area of the piston 722 can be multiplied by the pressure. Referring to FIG. 2, since the pressure receiving area of the piston 722 is about 4 cm$^2$ and the valve opening pressure of the injection valve 69 is set to be 100 kg/cm$^2$, the voltage generated by the electrostrictive actuator 200 when an injection begins is 400 V.

The control circuit 4 short-circuits the electrostrictive actuator 200 when the voltage generated by the electrostrictive actuator 200 reaches 500 V, i.e., at a predetermined timing immediately after the injection valve 69 begins to inject, thus decreasing the voltage to 0 V.

In this case, since the constriction of 25 μm occurs in the electrostrictive actuator 200, as shown in FIG. 4, the variable volume chamber 726 is expanded to 4 cm$^2 \times 25$ μm $= 10$ mm$^3$. Therefore, the pressure in the pump chamber 602 is decreased and the injection pressure from the injection valve 69 is also decreased, or the pressure in the pump chamber 602 changed as represented by a curve (B) shown in FIG. 5. In the latter case, injection from the injection valve 69 is temporarily interrupted, thereby realizing a pilot injection.

Figure 6:
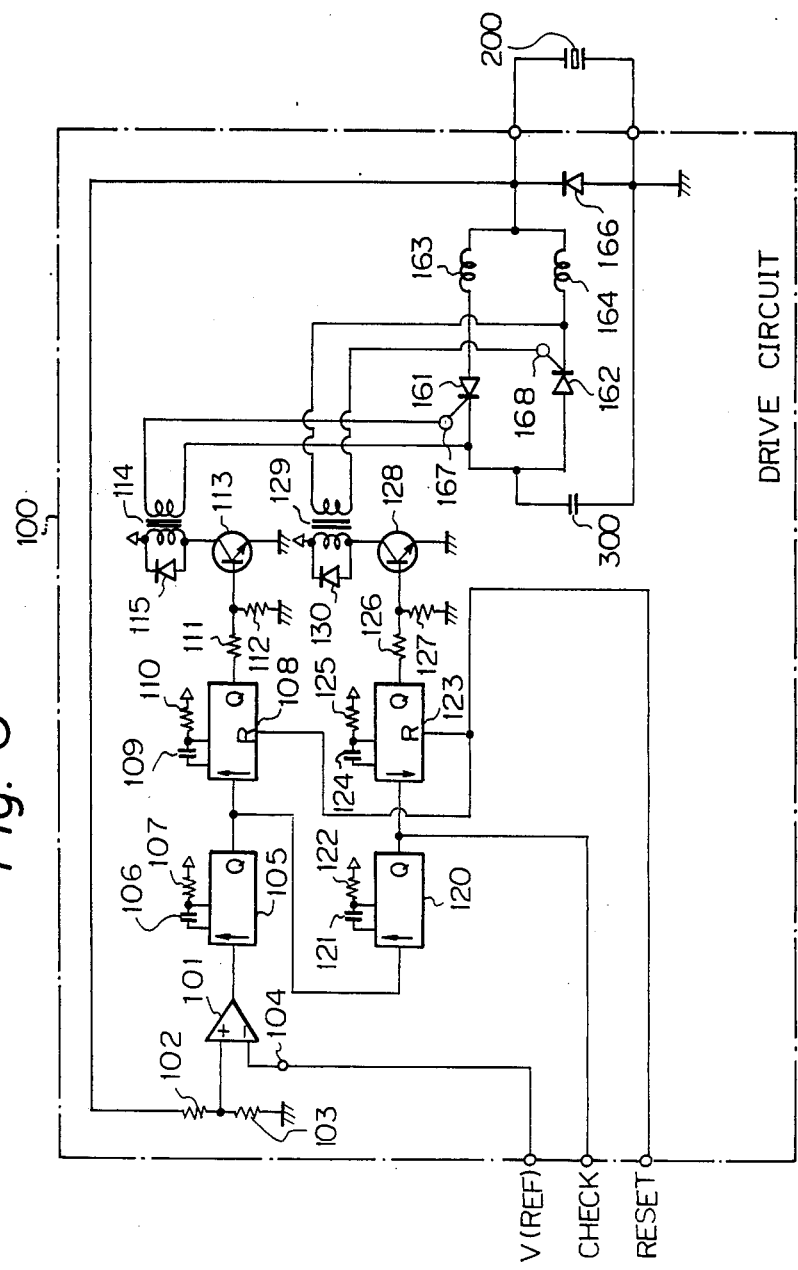
FIG. 6 is a circuit diagram showing an arrangement of a drive circuit of the electrostrictive actuator.

Since a decrease in pressure in the pump chamber becomes considerable as a constriction amount of the electrostrictive actuator 200 becomes larger, the pilot injection becomes notable. In addition, since an interval between the pilot injection and a main injection can be widened, noise and vibration can be effectively reduced. When a drive circuit 100 shown in FIG. 6 is used, an electric charge generated from the electrostrictive actuator 200 is charged on a capacitor 300, and when the electric charge is reused, the constriction amount of the electrostrictive actuator 200 can be increased, thereby improving an effect of the pilot injection.

Basic Arrangement of Drive Circuit for Electrostrictive Actuator

Figure 7:
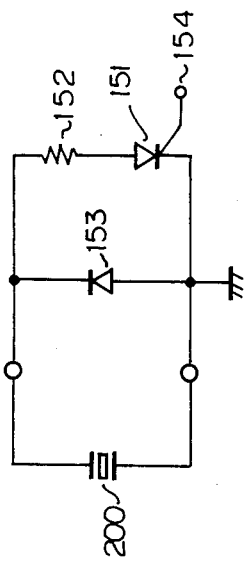
FIG. 7 is a circuit diagram of a circuit for short-circuiting the electrostrictive actuator.

The operation of the electrostrictive actuator driven by using the drive circuit 100 shown in FIG. 6 will be described hereinafter. FIG. 7 shows a circuit for simple short-circuiting of the electrostrictive actuator. A thyristor 151 is connected in parallel with the electrostrictive actuator 200 and in series therewith through a current limit resistor 152.

Reference numeral 153 denotes a diode in which the cathode side is connected to a high voltage and the anode side is grounded, i.e., is connected in a reverse direction. When the compression force to the electrostrictive actuator is decreased, the diode 153 supplies an electric charge to the actuator 200, thus extending the actuator 200 to its original length. When a trigger signal is supplied to a gate terminal 154 of the thyristor 151, the thyristor 151 is rendered conductive, thus short-circuiting the electrostrictive actuator 200 and causing it to constrict.

This state will be explained with reference to the timing charts shown in FIG. 8. Referring to FIG. 8, chart (1) represents a signal ATDC 60° (After Top Dead Center 60°); (2), a pressure of the pump chamber; (3), a trigger signal of the thyristor 151; (4), a terminal voltage of the electrostrictive actuator;.and (5), an injection rate of an injector. When the electrostrictive actuator 200 is open-circuited, a voltage proportional to the pressure of the pump chamber 602 is generated therein (FIG. 8(4)) When the pressure of the pump chamber 602 is higher than the opening pressure of the valve 69 and the voltage reaches a predetermined voltage (500 V) this state is detected and the trigger signal is generated to turn on the thyristor 151. Thus, the electrostrictive actuator 200 is constricted in correspondence with the voltage (500 V).

Since the pressure of the pump chamber will decrease, and injection is interrupted, the pilot injection can be performed as described above, as shown in FIG. 8(5). If the constriction amount of the electrostrictive actuator 200 is set to be large, effective pilot injection can be performed. For this reason, the drive circuit shown in FIG. 6 is provided to reutilize an electric charge generated by the electrostrictive actuator 200. FIG. 9 shows a circuit diagram of a main part of an example of the drive circuit according to the embodiment of the present invention. A coil 163 and a first thyristor 161 are series-connected at a high voltage side of the electrostrictive actuator 200, and are connected to the capacitor 300. A series circuit of a coil 164 and a second thyristor 162 is connected in parallel with the coil 163 and the first thyristor 161. FIG. 10 shows operational characteristics of this system. Referring to FIG. 10, chart (1) represents the pressure of the pump chamber 602; (2), a trigger signal of the thyristor 161; (3), a trigger signal of the thyristor 162; (4), a terminal voltage of the electrostrictive actuator 200; (5), an injection rate of an injector; and (6), a voltage of the capacitor 300.

When the pressure of the pump chamber 602 is higher than the opening pressure of the valve 69 and the voltage reaches a predetermined voltage (500 V), the first trigger signal is supplied to a gate terminal 167 of the first thyristor 161 (FIG. 10(2)). Thus, the thyristor 161 is rendered conductive. In this state, a series resonance circuit constituted by the electrostrictive actuator 200, the coil 163, and the capacitor 300 is formed, and an electric charge generated in the electrostrictive actuator 200 is transferred to the capacitor 300. For this reason, the electrostrictive actuator 200 is short-circuited and is constricted.

In this case, the pressure of the pump chamber 602 is decreased due to the constriction, thus representing a state of pilot injection as described above (FIG. 10(5)). During an interval between one fuel supply step and another step, the second thyristor 162 is triggered (FIG. 10(3)). Thus, the second thyristor 162 is rendered conductive, and a series resonance circuit constituted by the capacitor 300, the coil 164 and the electrostrictive actuator 200 is formed. Since the electric charge accumulated on the capacitor 300 is transferred to the electrostrictive actuator 200, a voltage of about 300 V is applied to the actuator 200. Thereafter, the next fuel supply step is started. In this case, since the voltage of the electrostrictive actuator 200 has already reached about 300 V, the voltage is increased as the fuel is supplied by pressure, and the voltage reaches 300 V+500 V=800 V at a timing at which the first thyristor 161 is to be triggered next time. At this time, since the thyristor 161 is rendered conductive, a constriction amount corresponding to the 800 V voltage can be obtained. Unlike the circuit shown in FIG. 7, which constricts simply by short-circuiting, since the voltage is increased from 500 V to 800 V, the constriction amount can be increased 1.6 times that of the conventional circuit shown in FIG. 7. As described above, the pilot injection effect can be improved, and noise and vibration can be effectively reduced.

The drive circuit 100 for the electrostrictive actuator 200 will be described in more detail with reference to FIG. 6. Referring to FIG. 6, reference numeral 101 denotes a comparator having a non-inverting input terminal to which the terminal voltage of the electrostrictive actuator 200, voltage-divided by resistors 102 and 103, is connected. A reference voltage V(REF) is supplied to the inverting input terminal 104 of the comparator 101. When the terminal voltage of the electrostrictive actuator 200 exceeds 800 V, the output from the comparator 101 becomes logic level "1". The output from the comparator 101 is connected to a rising trigger input of a retriggerable, first one-shot multivibrator 105.

An output pulse width of the first one-shot multivibrator 105 is determined by a capacitor 106 and a resistor 107. In the device shown in FIG. 6, the pulse width is set to be slightly longer than a pump fuel supply step interval in an idling state, e.g., to be about 15 msec.

With this arrangement, since a fuel supply interval is prolonged and a fuel supply pressure is increased in a high load state, as shown in FIG. 11, the voltage generated from the electrostrictive actuator 200 exceeds the reference voltage V(REF) even after pilot injection, and a plurality of short-circuiting operations are performed, as shown in FIG. 11(4).

Referring to FIG. 11, chart (1) represents the pressure of the pressure chamber in the low load state; (2), the terminal voltage of the electrostrictive actuator in the low load state; (3), the pressure of the pressure chamber in the high load state; (4), the terminal voltage of the electrostrictive actuator in the high load state; and (5), the output of the first one-shot multivibrator.

During a period in which the signal from the first one-shot multivibrator 105 is generated, unnecessary signals are masked. The output from the first one-shot multivibrator 105 is supplied to a rising trigger input of a second one-shot multivibrator 108. An output pulse width of the second one-shot multivibrator 108 is determined by a capacitor 109 and a resistor 110. Since this pulse width corresponds to that of the trigger signal of the first thyristor 161, it can be set short, e.g., about 30 μs.

The output from the second one-shot multivibrator 108 is connected to the base of a transistor 113. When the output from the second one-shot multivibrator 108 is at logic level "1", the transistor 113 is turned on. The collector of the transistor 113 is connected to a pulse transformer 114. When the transistor 113 is turned on, a current flows in the primary coil of the pulse transformer 114, and the trigger signal is induced in the secondary coil thereof.

The trigger signal is supplied to the gate terminal 167 of the first thyristor 161, thus triggering the first thyristor 161. A diode 115 is provided for absorbing a back pulse. The output from the first one-shot multivibrator 105 is also connected to a rising trigger input of a third one-shot multivibrator 120. An output pulse width of the third one-shot multivibrator is determined by a capacitor 121 and a resistor 122. This pulse width determines a timing at which the second thyristor 162 is triggered. Since the pulse width corresponds to an interval between the completion of a pump fuel supply step and the beginning of the next fuel supply step, it is set to be about 20 ms.

The output from the third one-shot multivibrator 120 is connected to a falling trigger input of a fourth one-shot multivibrator 123. An output pulse width of the fourth one-shot multivibrator 123 is determined by a capacitor 124 and a resistor 125, and is set to be about 30 μs. The output from the fourth one-shot multivibrator 123 is connected to the base of a transistor 128. When the output from the multivibrator 123 is at logic level "1", the transistor 128 is turned on. The collector of the transistor 128 is connected to a pulse transformer 129, and is also connected to the gate terminal 168 of the thyristor 162. A diode 130 is provided to absorb a back pulse.

The operation of the drive circuit 100 with the above arrangement will be described hereinafter, assuming a low speed and low load state. A cam is lifted upon rotation of a pump drive shaft, and the pressure of the pump chamber 602 is increased. Thus, the electrostrictive actuator 200 is pressed and a voltage is generated. An initial value of the voltage is 300 V and is increased therefrom since an electric charge previously accumulated in the capacitor 300 is supplied. The voltage generated from the electrostrictive actuator is divided by the resistors 102 and 103, and the divided voltage is compared with the reference voltage V(REF) by the comparator 101. When the terminal voltage of the electrostrictive actuator exceeds 800 V (FIG. 10(4)), the output from the comparator 101 becomes logic level "1" and triggers the one-shot multivibrator 105. In response to a rising of the output from the first one-shot multivibrator 105, the second one-shot multivibrator 108 is triggered and the transistor 113 is turned on through resistors 111 and 112. Thus, the first thyristor 161 is triggered through the pulse transformer 114 and is rendered conductive (FIG. 10(2)), thus transferring the electric charge from the electrostrictive actuator 200 to the capacitor 300. Accordingly, the terminal voltage of the electrostrictive actuator 200 is decreased to 0 V (FIG. 10(4)), and the actuator 200 constricts by about 40 μm. As described above, the pressure of the pump chamber 602 is decreased (FIG. 10(1)), and the injection is interrupted (FIG. 10(5)).

The thyristor 161 is automatically commutated by resonance of the coil 163 and becomes nonconductive. At this time, since the cam lift is at midpoint, fuel is further supplied under pressure, and the pressure of the pump chamber 602 is further increased, thus resuming the injection. Before the cam lift reaches the upper dead point, the spill port 617 is opened, and the pressure of the pump chamber 602 is spilled, thus ending the injection. In this case, the terminal voltage of the electrostrictive actuator tends to decrease to a negative voltage, as indicated in the broken line in FIG. 10(4). If the terminal voltage of the electrostrictive actuator becomes negative high voltage, polarization state of the electrostrictive actuator 200 may be destroyed. Therefore, a reverse voltage is short-circuited by a diode 166, so that the electrostrictive actuator 200 is protected. At the same time, an electric charge is supplied to the electrostrictive actuator 200 by the diode 166, thus extending the actuator 200 to its original length. In response to the leading edge of the output from the first one-shot multivibrator 105, the third one-shot multivibrator 120 is also triggered. When the output from the third one-shot multivibrator 120 falls, the fourth one-shot multivibrator 123 is triggered. After a lapse of 20 ms from when the first thyristor 161 is triggered, the fourth one-shot multivibrator 123 generates a signal, thus triggering the second thyristor 162 (FIG. 10(3)). At this time, the pump has already ended the fuel supply step and prepares for the next step, and the pressure of the pump chamber 602 is low. When the second thyristor 162 is rendered conductive, the charge in the capacitor 300 is returned to the electrostrictive actuator 200, and the terminal voltage thereof is increased to about 300 V.

Points to be Noted in Driving of Electrostrictive Actuator

The basic arrangement and operation of the drive circuit shown in FIG. 6 and used in FIG. 1 are as described above, and the following two points must be noted. The first is that whether or not the pilot injection is to be controlled in accordance with engine conditions, if the timings of the pilot injections are not frequently controlled, an effect thereof cannot be obtained. The second is how the base voltage portion shown in FIG. 10(4) is to be obtained. The driving method of the electrostrictive actuator in consideration of the above points will be explained hereinafter.

An injection rate control device using the electrostrictive actuator has as its main aspect reduction of noise and vibration in an idling mode in such a manner that pilot injection is performed or the initial injection rate is decreased. If pilot injections performed in a high load and high speed state, the injection rate can be improved, but the problem of noise and vibration cannot be resolved. In addition, since the problem of low engine power due to a low injection rate cannot yet be resolved, in the device shown in FIG. 1, the pilot injection is performed only in the idling mode.

Figure 12:
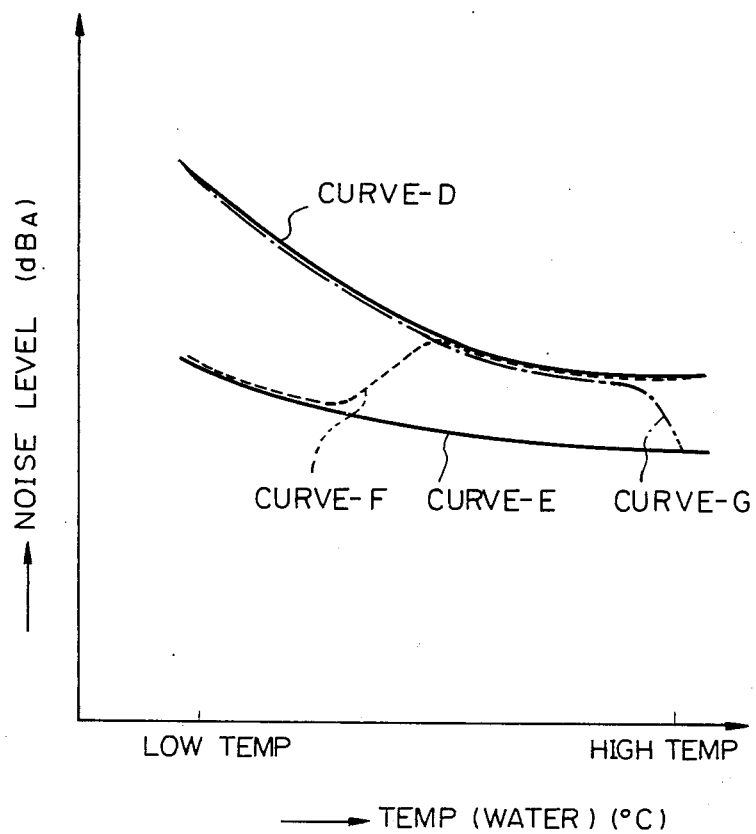
FIG. 12 is a graph showing engine noise characteristics.

It was found as a result of a number of experiments that even in the idling mode, an optimum pilot injection timing varies in accordance with the water and oil temperatures of an engine and an ON/OFF state of an air conditioner, and in a vehicle using torque converter, whether a gear shift lever is set at neutral (N) or drive (D). FIG. 12 is a graph wherein the abscissa indicates a water temperature TEMP(WATER) and the ordinate indicates a noise level NOISE LEVEL. Referring to FIG. 12, the noise level with respect to the water temperature is indicated under four conditions, i.e., a case wherein an injection rate control device is not used (CURVE-D), a case wherein the pilot injection timing is controlled to be optimum (CURVE-E), a case wherein the timing is controlled to be optimum only at low temperatures (CURVE-F), and a case wherein the timing is controlled to be optimum only at high temperatures (CURVE-G).

As can be seen from FIG. 12, if the timing is set to be optimum only at low or high temperatures, when the water temperature is changed, noise cannot be reduced. Therefore, the optimum pilot injection timing must be controlled, in accordance with a change in the water temperature. In order to change the optimum pilot injection timing, the reference voltage V(REF) of the comparator 101 in FIG. 6 is changed. Since the voltage generated by the electrostrictive actuator 200 corresponds to the fuel supply step shape of the pump, if the reference voltage V(REF) is set to be lower, the pilot injection timing shifts to a lead angle side. In contrast to this, if the reference voltage V(REF) is set to be higher, the pilot injection timing shifts to a lag angle side. Note that since the pilot injection timing shifts in accordance with the water temperature partially because the voltage generated by the electrostrictive actuator 200 varies in accordance with a change in temperature of the actuator 200, a temperature to be detected can be a fuel temperature in the fuel injection rate control device.

The above-mentioned second point will be discussed. As shown in FIG. 10(4), only when the base voltage portion is supplied as the terminal voltage of the electrostrictive actuator 200 reaches 800 V, is the first thyristor 161 rendered conductive, and the electrostrictive actuator 200 constricted, thus performing pilot injection. In this case, the electric charge of the electrostrictive actuator 200 is supplied to the capacitor 300, and when the second thyristor 162 becomes conductive, the charge of the capacitor 300 is returned to the actuator 200 and becomes the base voltage portion. Therefore, if the above operation is normally and continuously performed, the base voltage portion can be generated and the voltage from the actuator 200 reaches 800 V, thus performing pilot control. However, when no electric charge is stored on the capacitor, or when the above operation cannot be normally performed for any reason, since the base voltage portion becomes short or zero, the terminal voltage of the electrostrictive actuator 200 cannot reach 800 V. Therefore, the first thyristor 161 cannot become conductive, and the capacitor 300 cannot be charged. For this reason, pilot injection cannot be performed. In the above case, the reference voltage V(REF) of the comparator 101 must not be immediately increased to 800 V but must be gradually increased from 0 V. Thus, the base voltage portion is gradually increased from 0 V, and then a normal state can be obtained.

Preferred Control Circuit for Electrostrictive Actuator and Operation Thereof

The control circuit 4 in consideration of the above two points will be described with reference to FIG. 1.

Reference numeral 401 denotes an input interface. The input interface 401 transmits various input signals (to be described later) onto a bus line 405 through processing such as A/D conversion, waveshaping, counting or the like. Reference numeral 301 denotes an acceleration sensor utilizing a potentiometer interlocked with an accelerator pedal of an engine. The acceleration sensor 301 generates a voltage in accordance with an accelerator pedal stroke. The voltage signal from the sensor 301 is A/D converted by the input interface 401.

Reference numeral 302 denotes a temperature sensor mounted, e.g., on a water jacket of an engine. The temperature sensor 302 detects a cooling water temperature and generates a voltage corresponding to the detected temperature which is A/D converted by the input interface 401. The temperature sensor 302 can detect an oil temperature, a fuel temperature or a temperature of the electrostrictive actuator 200 in place of the water temperature. Reference numeral 304 denotes a rotation sensor, e.g., utilizing a magnetic pickup. The rotation sensor 304 is mounted on the drive shaft of the pump so as to face a disk plate 303 having projections corresponding to the number of engine cylinders. The rotation sensor 304 generates a signal having a frequency corresponding to the engine speed. The signal from the sensor 304 is counted by the input interface 401 as engine speed data N(E) and is transmitted onto the bus line 405. In addition, the signal from the sensor 304 is used as an interrupt signal for a CPU 402. Reference numeral 305 denotes a starter switch, and a starter switch signal reaches the "1" level when the engine is started. Reference numeral 306 denotes an air conditioning switch, and an air conditioning switch signal reaches the "1" level when an air conditioner is operated. Reference numeral 307 denotes a neutral switch, and a neutral switch signal reaches the "1" level only when a gear shift level is set in a neutral or parking range in a vehicle using a torque converter. The signals from the starter switch 305, the air conditioning switch 306 and the neutral switch 307 are supplied to the input interface 401 to be waveshaped, and thereafter are transmitted to the bus line 405. Reference numeral 402 denotes a CPU. The CPU 402 performs calculation control (to be described later) with reference to engine condition data from the input interface 401 to reduce noise in the idling mode. Reference numeral 403 denotes a ROM storing various data and a program for the CPU 402. Reference numeral 404 denotes a RAM for storing data; 405, the bus line for performing data communication between respective devices; and 406, a D/A converter for converting optimum reference voltage data calculated by the CPU 402 into an analog voltage V(REF). The output voltage from the D/A converter 406 is supplied to the inverting input terminal 104 of the comparator 101 in the drive circuit 100. Reference numeral 407 denotes a latch circuit. When the CPU 402 determines from the engine conditions if pilot control is to be performed, it generates data indicating the presence/absence of pilot control. When pilot control is performed, the output from the latch circuit 407 reaches the "0" level, and otherwise, the output therefrom reaches the "1" level. The output signal from the latch circuit 407 is supplied to the reset inputs of the second and fourth one-shot multivibrators 108 and 123. When the output from the latch circuit 407 is set at the "1" level, since the second and fourth one-shot multivibrators 108 and 123 are reset, the trigger signals for the first and second thyristors 161 and 162 are not generated and the pilot control is not performed. Reference numeral 100 denotes the drive circuit for the electrostrictive actuator 200. A CHECK signal from the third one-shot multivibrator 120 is supplied to the input interface 401. The CHECK signal is supplied to check if the device is normally operated in the pilot control state. When the base voltage portion cannot be obtained for any reason as described above, since the output from the third one-shot multivibrator 120 cannot be generated, the CPU 402 detects this state and performs processing to be described later, thus returning the device to a normal state.

Figure 13:
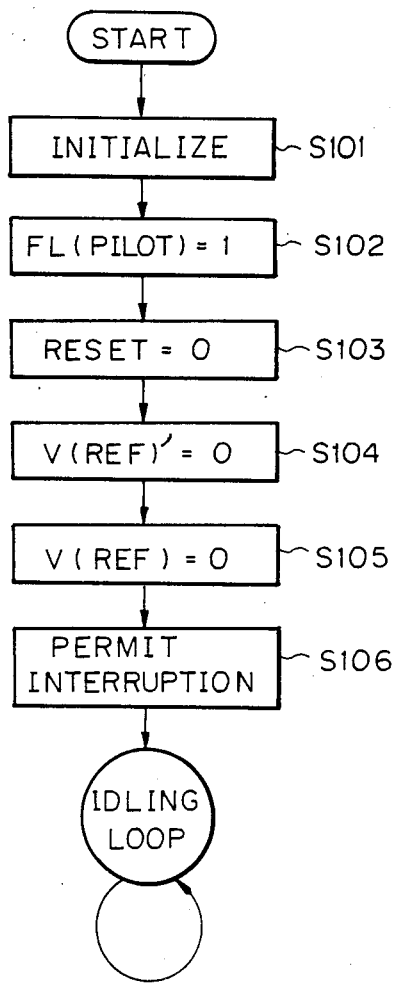
Figure 14A:
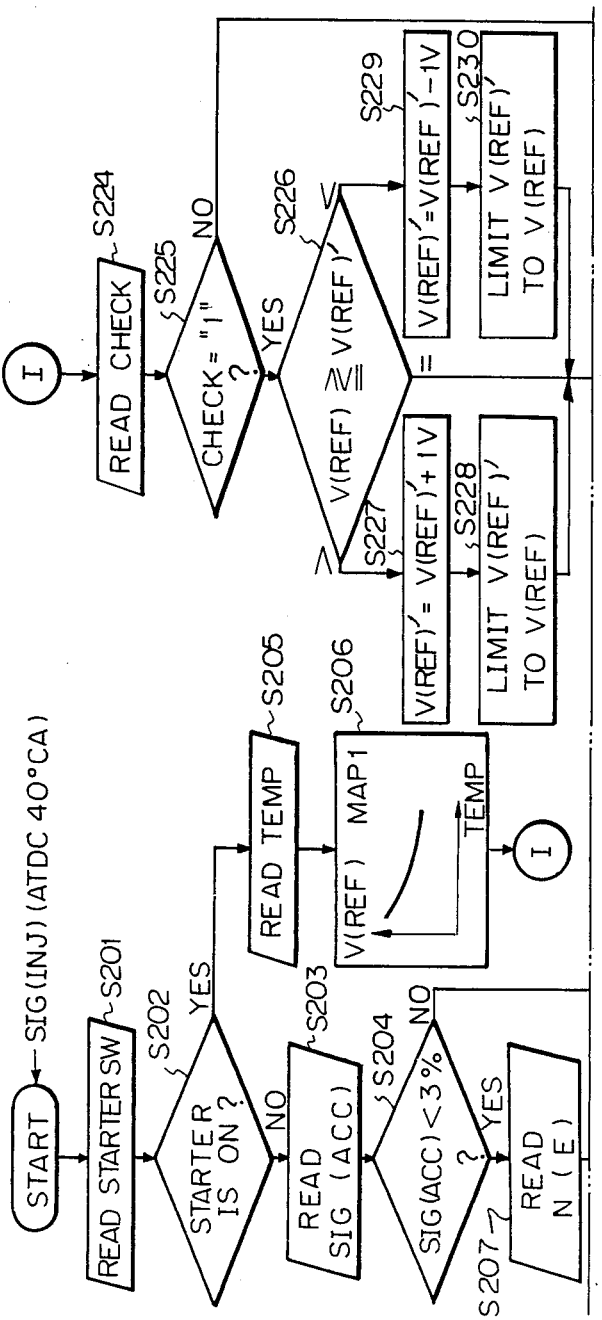
Figure 14B:
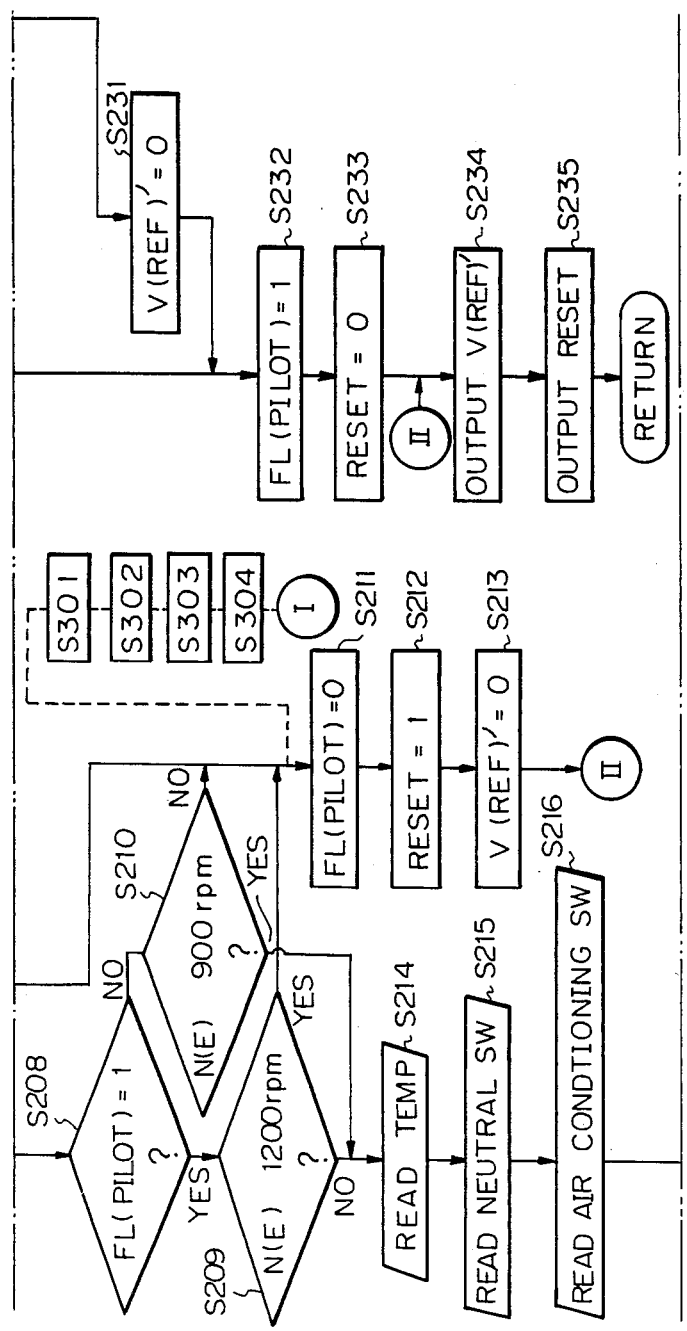
Figure 14C:
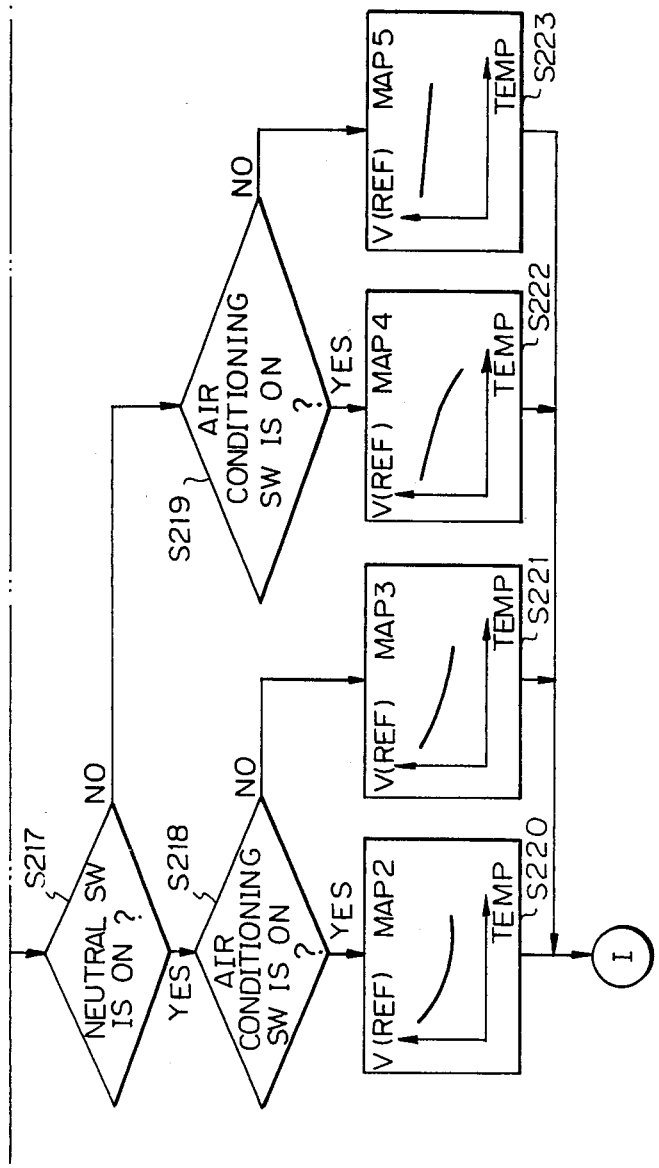
Figure 15:
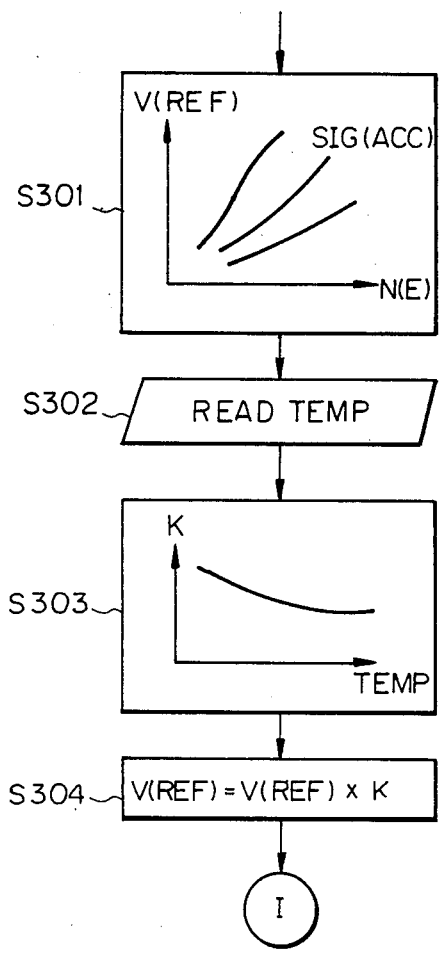

Embodiment shown in FIGS. 13, 14 and 15

Figure 16:
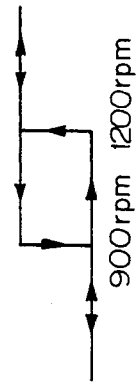
FIG. 16 is a diagram for explaining the discrimination of an idling state.
Figure 17:
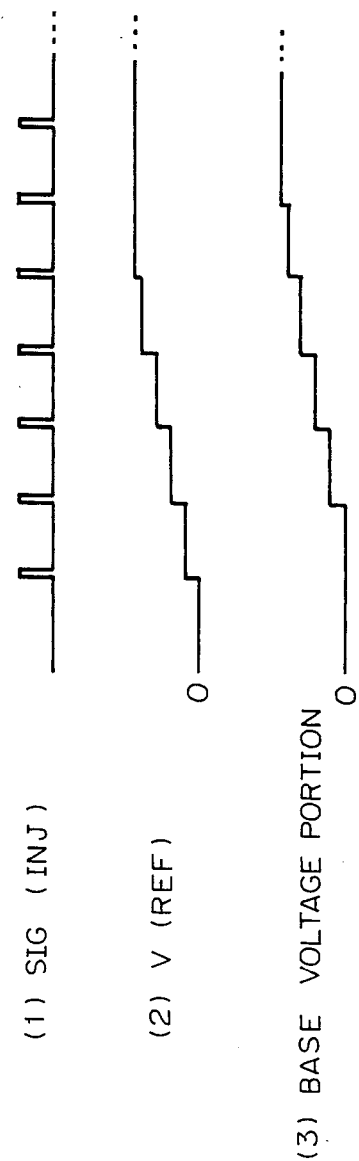
FIG. 17 is a waveform chart for explaining the stepwise increase characteristics of reference voltage.

The operation of the device with the above arrangement will be described with reference to the flow charts shown in FIGS. 13, 14 and 15. A main routine (FIG. 13) is executed immediately after a power source is turned on. After initializing respective portions, a flag FL(PILOT) indicating the presence/absence of pilot control is set at "1" (pilot control is performed), and a flag RESET for inhibiting the pilot control trigger signal (the trigger signal is generated) is set at "0". Thereafter, a previous reference voltage V(REF)' is set at 0 V, and a current reference voltage V(REF) is cleared to 0 V. Thus, an interruption operation is permitted, and the flow enters an idling loop. The interruption routine (FIG. 14) is started in response to a signal SIG(INJ) generated from the rotation sensor 304 in synchronism with the injection for each cylinder. The signal SIG(INJ) is generated at a timing of ATDC40° CA, and is generated between the first trigger signal (FIG. 10(2)) and the second trigger signal (FIG. 10(3)). When the interruption routine is started, the starter switch signal 305 is fetched. If it is detected that the starter switch is turned on, e.g, the vehicle is in a cranking state, since the injection amount and injection timing are set for a starting mode, a temperature from the temperature sensor 302 is fetched in order to refer to a map 1 for the starting mode. The reference voltage V(REF) corresponding to the optimum pilot injection timing is obtained by referring to the map 1 in accordance with the temperature. Thereafter, although the flow jumps to (I), it will be described later for the sake of simplicity. If it is detected that the starter switch is not turned on, since the vehicle is in a normal drive state, an accelerator pedal stroke signal SIG(ACC) is read from the input interface 401. If the accelerator pedal stroke signal SIG(ACC) is lower than 3%, it is determined that the accelerator pedal is completely closed. If the signal SIG(ACC) is equal to or higher than 3%, it is determined the accelerator pedal is depressed, thus disabling the pilot control. If the accelerator pedal stroke signal SIG(ACC) is lower than -3%, the engine speed data N(E) is fetched. If the engine speed is an idling speed, it can be determined that the engine is in the idling mode. However, if the idling mode is determined at a signal point, when the engine speed is at a margin between the idling mode and the normal driving mode, a chattering phenomenon occurs, thus resulting in discomfort. For this reason, a hysteresis is provided as shown in FIG. 16. In other words, when pilot control is performed, the engine is controlled along a lower horizontal line shown in FIG. 16 until the engine speed exceeds 1,200 rpm. Conversely, when pilot control is not performed, the engine is controlled along an upper line in FIG. 16 so that pilot control is resumed when the engine speed is decreased to 900 rpm or less. If it is determined under the above idling mode detection conditions that the engine is not in the idling mode, a flag FL(PILOT) indicating pilot control is set at "0" and the flag RESET is set at "1". In addition, the reference voltage V(REF)' is cleared to 0 V, and thereafter, the flow jumps to an output routine of the voltage V(REF)' and the flag RESET, and returns to the main routine. When the idling mode detection conditions are satisfied, the temperature signal TEMP, the neutral switch signal and the air conditioning switch signal are fetched. From the combinations of the ON/OFF state of the neutral switch and the air conditioning switch, the flow is divided into four conditions. Thus, the reference voltage V(REF) corresponding to the temperature signal TEMP is obtained from the maps 2 to 5 which were prepared in advance by, e.g., a bench test, to be optimum in the respective conditions. Then, the signal CHECK is fetched from the input interface 401. When pilot control is normally performed, the signal CHECK reaches the "1" level. If the signal CHECK is not at logic level "1", it is determined that an abnormality has occurred, thus temporarily decreasing the voltage V(REF)' to 0 V. If normal, the flow advances to a blunting routine of the voltage V(REF). In the blunting routine of the voltage V(REF), the voltage V(REF) is increased stepwise as shown in FIG. 17 to increase the base voltage portion. Thus, the engine can be reliably set in the pilot control state. Note that, if a blunting speed of the voltage V(REF) is too high, an increase in base voltage portion cannot cope with that in the voltage V(REF), and the engine cannot be set in the pilot control state. However, if the blunting speed of the voltage V(REF) is too low, although the engine is in the idling mode, noise becomes out for a long period of time. The present inventors experimentally found that if the voltage V(REF) was increased stepwise by about 100 V for each injection, the increase in the base voltage portion could become optimum. The current reference voltage V(REF) corresponding to the optimum pilot injection timing obtained from the map is compared with the previous voltage V(REF)', and if coincidence therebetween is found, the voltage is used. If V(REF)>V(REF)', the current reference voltage is gradually increased from the voltage V(REF)' up to the value of V(REF). As described above, since the blunting speed can be 100 V for each injection, if a voltage dividing ratio of the resistors 102 and 103 shown in FIG. 6 is set to be 1/100, the voltage V(REF) can be increased stepwise by 1 V for each injection. Therefore, the voltage V(REF)' is incremented by 1 V for each injection up to the voltage V(REF), or if exceeding the voltage V(REF), the voltage V(REF)' is limited to the voltage V(REF), thus updating the voltage V(REF)'. Conversely when V(REF)>V(REF)', the voltage V(REF)' is decremented by 1 V for each injection, and is limited to the voltage V(REF). Then, the flag FL(PILOT) indicating that pilot control is being performed is set at "1", and the flag RESET is set at "0". Thereafter, the voltage V(REF)' is supplied to the D/A converter 406 and the flag RESET is supplied to the latch circuit 407, thus returning to the main routine.

The above operation can be summarized as follows:
(i) The pilot control is performed only when the engine is in the idling mode.
(ii) The voltage V(REF) is corrected in accordance with a temperature of the engine such as a water temperature.
(iii) The voltage V(REF) is gradually increased from 0 V when the pilot control is initiated.
(iv) The same control as in (iii) is performed in the starting mode.
(v) When an abnormality occurs, the voltage V(REF) is temporarily decreased to 0 V, and (iii) is performed.

According to the device shown in FIG. 1 under actual operating conditions, in the drive circuit wherein an electric charge generated from the electrostrictive actuator is reutilized as a base voltage portion so that the constriction amount of the electrostrictive actuator is increased, a blunting function for effectively increasing the base voltage portion is provided so that the pilot control timing is frequently corrected in accordance with the engine conditions, thus always realizing optimum noise reduction.

In the above embodiment, pilot control is limited to the idling mode. However, the present inventors experimentally found that if pilot control was performed other than in the idling mode, emission, e.g., $NO_x$, could be effectively reduced. If pilot control is performed other than in the idling mode, when it is determined in the interruption routine in FIG. 14 that the engine is in the non-idling mode the voltage V(REF) can be obtained in accordance with the accelerator pedal stroke and the engine speed. FIG. 15 shows a modified portion of FIG. 14. A two-dimensional map of the voltage V(REF) is referred to in accordance with the accelerator pedal stroke signal SIG(ACC) and the engine speed data N(E), and the temperature signal TEMP is then fetched. A map of a correction coefficient K is referred to in accordance with the temperature TEMP to correct the voltage V(REF), and the flow then jumps to (I). In this case, since pilot control is always performed (although in practice pilot control is not always performed), the flags FL(PILOT) and RESET are not needed.

Figure 19:
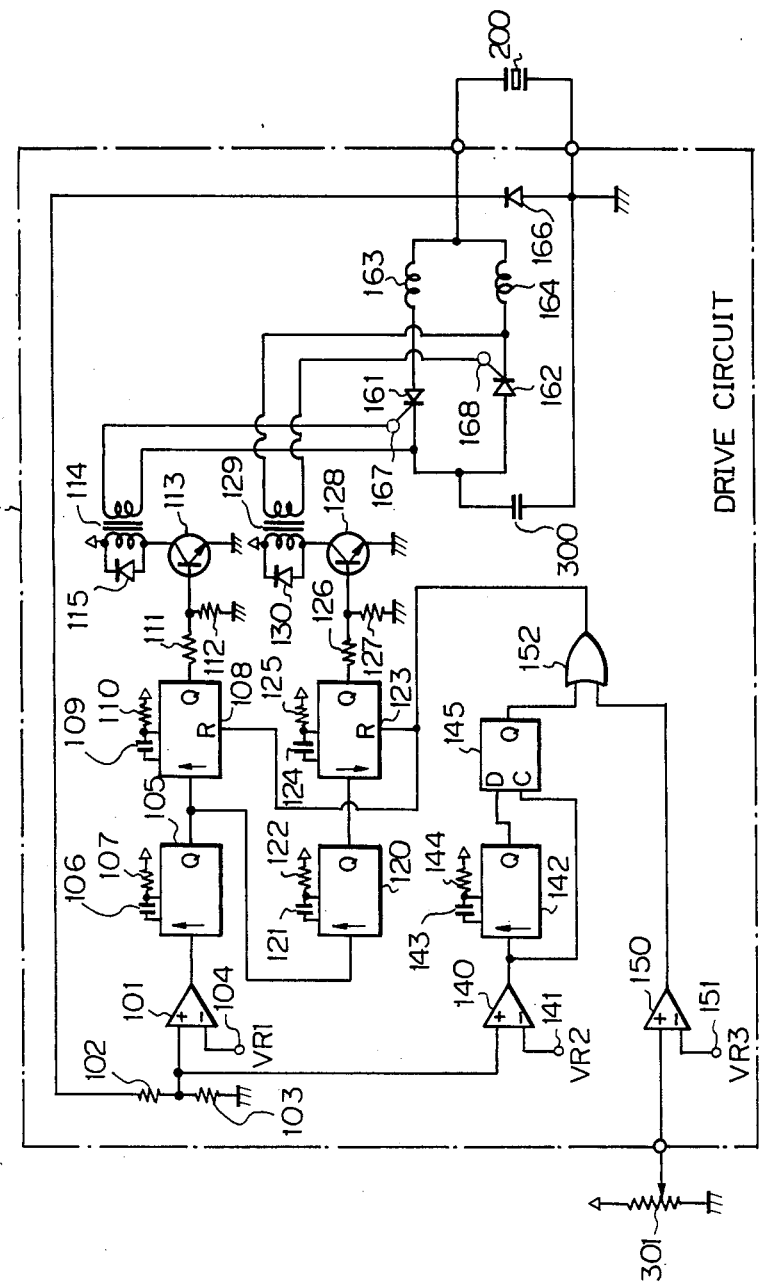
FIG. 19 is a circuit diagram of a drive circuit according to another embodiment of the present invention.

Embodiment shown in FIG. 19

FIG. 19 shows a drive circuit according to another embodiment of the present invention. The structure of the drive circuit shown in FIG. 19 has a common portion with the structure of the circuit shown in FIGS. 6 and 9. Therefore, the description concerning FIGS. 6 and 9 should be referred to.

Figure 18:
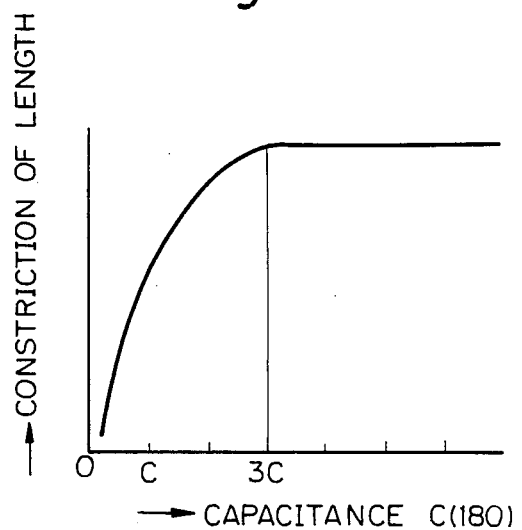
FIG. 18 is a graph showing electrostrictive actuator constriction characteristics as a function of a capacitance of a capacitor.

Meanwhile, a capacity of the capacitor 300 described with respect to the above described embodiment for accumulating an electric charge generated from the actuator 200 must be optimum. FIG. 18 is a graph showing constriction amounts of the actuator 200 when a capacitance of the capacitor varies. Assuming that the capacitance of the capacitor 300 is C(300), the constriction amount is saturated when 3 x C(300). As can be seen from the graph, the capacitance of the capacitor 300 can be 3 x C(300) or higher.

In the embodiment shown in FIG. 19, reference numeral 101 denotes a first comparator. A terminal voltage of the electrostrictive actuator 200 is voltage divided by the resistors 102 and 103 and the divided voltage is supplied to the non-inverting terminal of the comparator 101. The inverting terminal of the comparator 101 is connected to a reference voltage (VR1) source 104. When the terminal voltage of the electrostrictive actuator 200 exceeds 800 V, the output from the comparator 101 reaches the logic level "1". The output from the first comparator 101 is connected to a rising trigger input of a retriggerable first one-shot multivibrator 105.

An output pulse width of the first one-shot multivibrator 105 is determined by a capacitor 106 and a resistor 107. In the device shown in FIG. 19, the pulse width is set to be slightly longer than a pump fuel supply step interval in the idling mode, e.g., 15 msec. This is to prevent a plurality of short-circuiting operations (FIG. 11(4)) occurring for the following reason: in a high load state, since the fuel supply interval is prolonged and a fuel supply pressure is increased as shown in FIG. 11, even after first short-circuiting for the pilot injection, the voltage from the electrostrictive actuator may exceed the reference voltage (VR1).

In other words, while a signal is generated from the first one-shot multivibrator 105, unnecessary signals are masked. The output from the first one-shot multivibrator 105 is connected to a rising trigger input of a second one-shot multivibrator 108. An output pulse width of the second one-shot multivibrator is determined by a capacitor 109 and a resistor 110. Since the pulse width corresponds to that of the trigger signal for the first thyristor 161, it can be set to be short, e.g., about 30 μs.

The output from the second one-shot multivibrator 108 is connected to the base of a transistor 113 through resistors 111 and 112. When the output from the second one-shot multivibrator 108 is at logic level "1", the transistor 113 is turned on. The collector of the transistor 113 is connected to a pulse transformer 114. When the transistor 113 is turned on, a current flows in the primary coil of the pulse transformer 114 and a trigger signal is induced in the secondary coil thereof.

The trigger signal is supplied to the gate terminal 167 of the first thyristor 161, thus triggering the first thyristor 161. A diode 115 is provided for absorbing a back pulse. The output from the first one-shot multivibrator 105 is also connected to a rising trigger input of a third one-shot multivibrator 120. An output pulse width of the third one-shot multivibrator 20 is determined by a capacitor 121 and a resistor 122. The pulse width determines a timing at which a second thyristor 162 is triggered, and is set to be about 20 ms in order to set this timing between the pump fuel supply step and the next step.

The output from the third one-shot multivibrator 120 is connected to a falling trigger input of a fourth one-shot multivibrator 123. An output pulse width of the fourth one-shot multivibrator 123 is determined by a capacitor 124 and a resistor 125, and is set to be about 30 μs. The output from the fourth one-shot multivibrator 123 is connected to the base of a transistor 128 through resistors 126 and 127. When the output from the fourth one-shot multivibrator 123 is at logic level "1", the transistor 128 is turned on. The collector of the transistor 128 is connected to a pulse transformer 129 connected to the gate terminal 168 of the second thyristor 162. A diode 130 is provided for absorbing a back pulse.

The voltage divided by the resistors 102 and 103 generated from the electrostrictive actuator 200 is also supplied to the non-inverting input terminal of a second comparator 140. The inverting input terminal of the comparator 140 is connected to a reference voltage (VR2) source 141. When the terminal voltage of the electrostrictive actuator 200 exceeds 600 V, the output from the second comparator 140 reaches the "1" level.

The output from the second comparator 140 is connected to a rising trigger input of a fifth one-shot multivibrator 142. An output pulse width of the fifth one-shot multivibrator 142 is determined by a capacitor 143 and a resistor 144. This pulse width is set to correspond to a pump fuel supply interval when the engine speed is 1,200 rpm, i.e., 25 msec, in a four-cylinder engine.

The output from the fifth one-shot multivibrator 142 is connected to the D input of a D flip-flop 45, and the clock input of the D flip-flop 145 is connected to the output of the second comparator 140. The Q output of the D flip-flop 145 is connected to one input terminal of 2-input OR gate 152.

Reference numeral 301 denotes a potentiometer, interlocked with an accelerator pedal (not shown), for generating a voltage signal corresponding to a load applied thereto. The voltage signal is supplied to the non-inverting input of a third comparator 150. The inverting input of the comparator 150 is connected to a reference voltage (VR3) source 151. For example, when an accelerator pedal stroke exceeds 10%, the output from the third comparator 150 reaches the "1" level.

The output from the third comparator 150 is connected to the other input of the 2-input OR gate 152. The output from the 2-input OR gate 152 is connected to reset inputs of the second and fourth one-shot multivibrators 108 and 123. When the output from the 2-input OR gate 152 is at logic level "1", since the second and fourth one-shot multivibrators 108 and 123 are reset, no trigger signal is generated.

The operation of the device shown in FIG. 19 will be described hereinafter, assuming that the engine is in the low speed and low load state. A cam is lifted upon rotation of the pump drive shaft, thus increasing the pressure of the pump chamber 602, the electrostrictive actuator 200 is compressed, thus generating a voltage. An initial value of the voltage is increased from 300 V because an electric charge on the capacitor 300 is supplied to the actuator 200. The voltage generated from the actuator 200 is divided by the resistors 102 and 103 and the divided voltage is compared with the reference voltage (VR1) by the first comparator 101. When the terminal voltage of the electrostrictive actuator exceeds 800 V (FIG. 10(4)), the output from the first comparator 101 reaches the "1" level, thus triggering the first one-shot multivibrator 105. In response to the rising of the output from the first one-shot multivibrator 105, the second one-shot multivibrator 108 is triggered, thus enabling the transistor 113 through the resistors 111 and 112. The first thyristor 161 is triggered through the pulse transformer 114 (FIG. 10(2)), and an electric charge generated from the electrostrictive actuator 200 is supplied to the capacitor 180. The terminal voltage of the electrostrictive actuator 200 is decreased to 0 V (FIG. 10(4)), and the actuator 200 is constricted by about 40 μm. As described above, the pressure of the pump chamber 602 is decreased (FIG. 10(1)), and the injection is interrupted (FIG. 10(5)). The first thyristor 161 is automatically commutated by resonance of the coil 163 and is disabled. At this time, since the cam is being lifted, the fuel supply step is further continued and the pressure of the pump chamber 602 is increased, thus resuming injection. Before the cam lift reaches an upper dead point, the spill port is opened, and the pressure of the pump chamber is spilled, thus ending injection. At this time, although the terminal voltage of the electrostrictive actuator 200 is to be decreased to a negative voltage, as incidated by the dotted line in FIG. 10(4), if the terminal voltage is negatively high, polarization of the electrostrictive actuator 200 may be disturbed. For this reason, a reverse voltage is short-circuited by the diode 166 so that the actuator 200 is protected. The third one-shot multivibrator 120 is triggered in response to the rising of the first one-shot multivibrator 105. In response to the falling of the third one-shot multivibrator 120, the fourth one-shot multivibrator 123 is also triggered. After a lapse of about 20 ms from when the first one-shot multivibrator 105 was triggered, the fourth one-shot multivibrator 123 generates a signal, thus triggering the second thyristor 162 (FIG. 10(3)). At this time, since the pump completes its fuel supply step and prepares for the next fuel supply step, the pressure of the pump chamber is low. When the second thyristor 162 is rendered conductive, the electric charge on the capacitor 180 is returned to the electrostrictive actuator 200, and the terminal voltage of the actuator is increased to about 300 V.

Next, a method wherein the electrostrictive actuator 200 is not controlled in accordance with engine conditions will be described hereinafter. In the high load or high speed state, even if pilot injection is performed, noise and vibration cannot be effectively reduced. When pilot injection is performed, since the injection rate is decreased and engine power is reduced, the electrostrictive actuator 200 is not controlled. For example, in the high load state, the output voltage from the potentiometer 301 is high. When the load is higher than a predetermined value, the output from the third comparator 150 reaches the "1" level. The output signal from the third comparator 150 resets the first and fourth one-shot multivibrators 108 and 123 through the 2-input OR gate 152. In the high load state, since the trigger signals for the first and second thyristors 161 and 162 are not generated, the electrostrictive actuator 200 is not controlled and is kept open-circuited. Similarly, for the engine speed, although the output from the second comparator 140 reaches the "1" level for each fuel supply step of the pump, if this "1" level period of the output from the comparator 140 becomes shorter than the output pulse width 25 ms of the fifth one-shot multivibrator 142, the Q output from the D flip-flop 145 reaches the "1" level, thus resetting the second and fourth one-shot multivibrators 108 and 123 through the 2-input OR gate 152. For this reason, the trigger signals for the first and second thyristors 161 and 162 are not generated, and control of the electrostrictive actuator 200 is interrupted.

In the device shown in FIG. 19, the electrostrictive actuator 200 can be controlled without requiring an external high voltage power source, and the constriction amount can be doubled as compared to the conventional device which is simply shot-circuited. Therefore, an effect of pilot injection can be improved, thus reduction noise and vibration.

Figure 20:
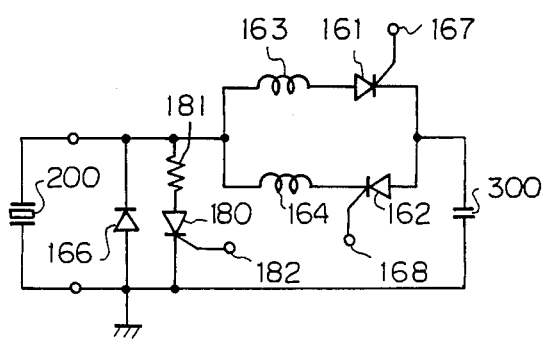
FIG. 20 is a circuit diagram of a drive circuit according to still another embodiment of the present invention.

Embodiment shown in FIG. 20

As another embodiment, FIG. 20 shows the circuit diagram of an example of the drive circuit. A third thyristor 180 and a resistor 181 are connected in parallel with the electrostrictive actuator. The cathode of the third thyristor 180 is grounded and the anode thereof is connected at the high voltage side of the electrostrictive actuator 200 through the current limit resistor 181.

According to the device shown in FIG. 20, pilot injection can be more satisfactorily performed by supplying an electric charge to the electrostrictive actuator to extend it, and an interval between the pilot injection and the main injection.

The operation of the device shown in FIG. 20 will be described. FIG. 21 shows the operational characteristics. Referring to FIG. 21, chart (1) represents a pressure of a pump chamber: (2), a terminal voltage of the electrostrictive actuator; (3), a trigger signal of a second thyristor; (4), a trigger signal of a third thyristor; (5), a trigger signal of a first thyristor; (6) an injection amount of an injection valve; and (7), a voltage of the capacitor.

Assume that the capacitor 300 is charged to a high voltage (600 V) in advance by the electrostrictive actuator, and a voltage of the electrostrictive actuator 200 is 0 V. When the pump begins supplying fuel by pressure, the pressure of the pump chamber 602 is increased (FIG. 21(1)), and the voltage generated from the electrostrictive actuator is also increased in response to this (FIG. 21(2)).

When the pressure of the pump chamber has reached a predetermined value immediately before a valve opening pressure, this state is detected and a second trigger signal for triggering the second thyristor 162 is generated (FIG. 21(3)). Thus, the second thyristor 162 is rendered conductive and an electric charge on the capacitor 300 is returned to the electrostrictive actuator 200. Therefore, the terminal voltage of the electrostrictive actuator 200 is abruptly increased as shown in FIG. 21(2), thus extending the electrostrictive actuator by 15 μm.

Since the piston 722 moves to the left and a volume of the pump chamber 602 is decreased, the pressure of the pressure chamber 602 is also increased and exceed the valve opening pressure, thus initiating the injection (FIG. 21(1)). That is, a start timing of the pilot injection can be controlled by the timing for triggering the second thyristor 162. After the lapse of a predetermined period of time from when the second thyristor 162 is triggered, the third thyristor 180 is triggered (FIG. 21(4)). The third thyristor 180 is rendered conductive and an electric charge of the electrostrictive actuator 200 is discharged through the resistor 181. Thus, the terminal voltage of the electrostrictive actuator 200 is decreased to 0 V (FIG. 21(2)), and the electrostrictive actuator 200 is constricted by about 15 μm. The constriction amount is substantially the same as the extension amount.

Since the pressure of the pump chamber 602 is decreased below the valve opening pressure, injection of the injection valve 69 is interrupted (FIG. 21(6)). Since the plunger 606 continues fuel supply, the pressure of the pressure chamber 602 is increased again. When the pressure of the pressure chamber 602 exceeds the valve opening pressure, injection is resumed, thus performing pilot injection. The voltage is generated from the electrostrictive actuator 200 and is continuously increased (FIG. 21(2)).

When the voltage reaches a peak value, e.g., about 800 V, a signal for triggering the first thyristor 161 is generated (FIG. 21(5)). The first thyristor 161 is rendered conductive and an electric charge of the electrostrictive actuator 200 is transferred to the capacitor 300, and the capacitor 300 is charged to 600 V (FIG. 21(7)).

In this case, although the pressure of the pressure chamber 602 is slightly decreased as shown in FIG. 21(1), since the pressure is considerably higher than the valve opening pressure, injection is not interrupted. Thereafter, the spill port is opened and one cycle of injection is completed.

As described above, according to the device shown in FIG. 20, since the electrostrictive actuator is extended utilizing an electric charge on the capacitor 300, pilot injection can be more effectively performed. From the experimental result, in a pintle or hole nozzle having large lift-flow rate characteristics (μf characteristics) with which the device of FIG. 19 could not perform pilot injection, pilot injection could be realized and noise and vibration thereof could be reduced.

Figures 22, 22A:
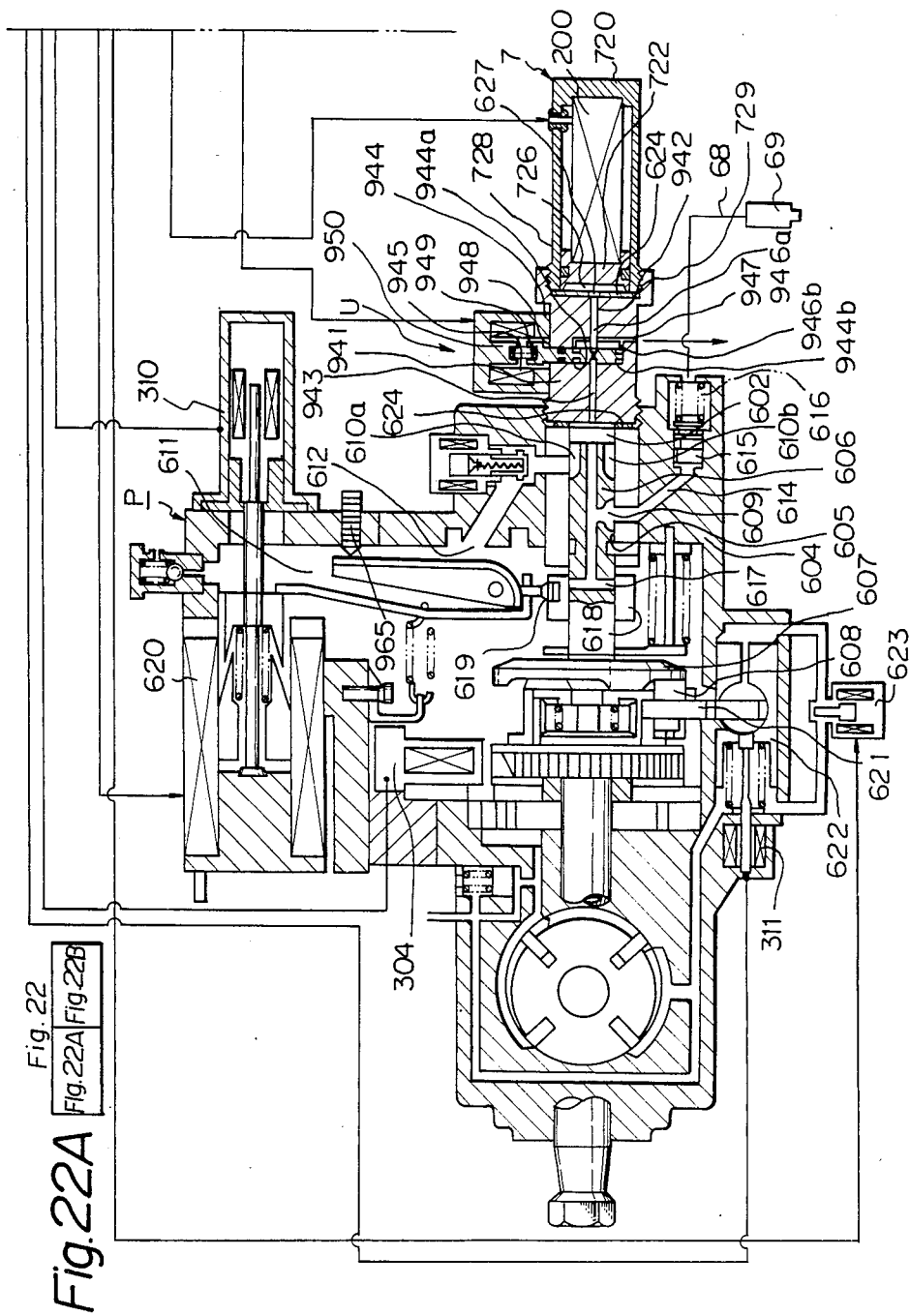
FIGS. 22, 22A and 22B are a sectional view showing a fuel injection pump using an electrostrictive actuator device according to another embodiment of the present invention.
Figure 22B:
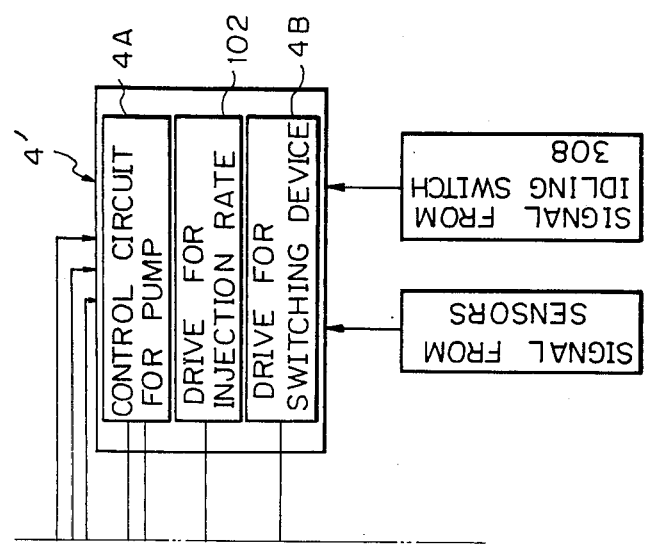

Embodiment shown in FIG. 22

FIG. 22 shows a fuel injection pump using an electrostrictive actuator device according to still another embodiment of the present invention. In the device shown in FIG. 22, a switching device U is series-connected between a pump chamber 602 of a distributor type fuel injection pump P and an injection rate control device 7.

In the injection rate control device without using the switching device, when the injection rate is controlled by the injection rate control device 7 in, e.g., an idling state, if a conentional injection pump having normal injection rate and injection timing characteristics is driven, a high fuel pressure generated in the pump chamber 602 causes the electrostrictive actuator 200 to be constricted by a small amount and a volume of the variable volume chamber communicating with the pump chamber 602 is increased. As a result, an injection amount is decreased from a proper value. In addition to this, an injection timing is delayed from a proper timing. In order to resolve the above drawback, a method has been proposed wherein a full-load stopper (smoke set) 965 shown in FIG. 22 for determining injection amount characteristics of the injection pump P is inserted in advance, and the injection rate is controlled by the injection rate control device 7 to appropriately control the injection amount. However, in this method, although the proper injection rate can be maintained only in the idling state in the same manner as in the device, the injection amount is increased from the proper value in another driving state, resulting in the generation of smoke, poor drivability and the like. An injection timing also will be shifted from a proper value.

In contrast to this, according to the device of FIG. 22, for example, in the idling condition, the injection rate control device 7 is effectively operated so that injection rate control having a high noise reduction effect, i.e., pilot injection, is performed, and under another driving condition, the operation of the injection rate control device 7 is disabled by the switching device U and the injection pump is controlled to obtain a proper injection amount and injection timing.

The fuel injection pump P will be described.

A plunger 606 slidably supported in a cylinder bore 605 of a casing 604 is reciprocated in synchronism with half an engine revolution. Rotation of the engine is transmitted to a drive shaft through a gear for a timing belt. The plunger 606 is coaxially rotated by the drive shaft, and is reciprocated when a face cam 607 is engaged with a roller 608. The face cam 607 is continuously biased to the left in FIG. 22 by a spring (not shown) so as to be engaged with the roller 608. The plunger 606 is reciprocated by the roller 608 being rotated about its central axis along a cam surface of the face cam 607. A distribution port 609 and intake ports 610a and 610b corresponding in number to the engine cylinders are formed in an outer peripheral surface of the plunger 606, and a pump chamber 602 is formed between a distal end face of the plunger and the cylinder bore 605.

In the casing 604, a low pressure chamber 611, an intake path 612 for communicating the low pressure chamber 611 with the cylinder bore 605, and distribution paths 614 for communicating external injection valves 69 with the cylinder bore 605 are formed. The number of distribution paths 614 corresponds to the number of engine cylinders, and delivery valves 615 are provided in the respective paths 614. Each delivery valve 615 can be opened against a spring 616 and serve as a delivery and retraction valve.

When the plunger 606 moves to the left and the pump chamber 602 is expanded, one of the intake ports 610 communicates with the corresponding intake path 614 and fuel in the low pressure chamber 611 is taken into the pump chamber 602. In contrast to this, when the plunger 606 moves to the right and the pump chamber 602 is compressed, the distribution port 609 communicates with one of the distribution paths 614, and the fuel in the pump chamber is supplied to the injection valves 69. The fuel supply step is started when the plunger 606 begins to move to the right, and is completed when the plunger 606 further moves to the right and a spill port 617 is released in the low pressure chamber 611 from a right end face of a spill ring 618.

Note that the spill port 617 is an opening provided in the plunger 606 and communicates the pump chamber 602 and the low pressure chamber 611. The spill ring 618 has a short cylindrical shape and the plunger 606 is slid therein. The fixed position of the spill ring 618 can be changed by a lever 619, and a fuel supply amount of the pump chamber 602 can be changed in accordance with the position of the spill ring 618. The lever 619 is interlocked with a spill control solenoid 620. A roller ring 621 for supporting the roller 608 is controlled by a timing piston 622 and a timing control valve 623.

The injection rate control device 7 is constituted by housing an electrostrictive actuator 200, a piston 722, a belleville spring 723 and a distance piece 624 in a casing 720. The casing 720 has a cylindrical shape with a bottom, and is fixed to an adaptor body 941 of the switching device U by a male screw 729 provided at an open-end portion thereof to be coaxial with a plunger 606.

The distance piece 624 has a disk shape, and has a through hole 627 at its center. A diameter of the distance piece 624 is slightly larger than that of the piston 722. When the male screw 729 of the casing 720 is tightened, the distance piece 624 is sandwiched between the casing 720 and the adapter body 941, thus providing a seal therebetween. The variable volume chamber 726 communicates with the pump chamber 602 through the through hole 627, communicating holes 942 and 943 of the adapter body 941, and a through hole 947 of a selector 944.

The switching device U will be described. The switching device U consists mainly of the adapter body 941, the communicating holes 942 and 943, the selector 944, and a solenoid 945.

The adapter body 941 is fixed to the casing of the pump by the male screw at the left side of FIG. 22, and the annular distance piece 624 is provided therebetween as a seal member. The other end of the adapter body 941 has a female threads which meshes with the male screw 729 of the injection rate control device 7.

The adapter body 941 has the communicating holes 942 and 943 extending coaxial therewith when the pump chamber communicates with the variable volume chamber 726. A hole having an upper open end in FIG. 22 is formed in a central portion of the body 941 which is not threaded in a direction perpendicular to axes of the communication holes 942 and 943, and the selector 944 is slid therein. Relief paths 946a and 946b are provided in this sliding portion at positions corresponding to relief grooves 944a and 944b of the selector 944. The relief paths 946a and 946b are connected to a return of a fuel tank or the fuel injection pump P to return leaking fuel.

The selector 944 is oil-tightly and slidably fitted in the slide hole of the adapter body 941, and has the through hole 947 having substantially the same diameter as that of the communicating holes 942 and 943, to communicate the holes 942 and 943 with each other. An annular groove or notch along the outer peripheral surface of the valve 944 is formed in two open ends of the through hole 947 to communicate the communicating holes 942 and 943. The annular relief grooves 944a and 944b are formed in the outer peripheral surface of the selector 944 at upper and lower sides of the through hole 947, and communicate with the relief paths 946a and 946b of the adapter body 941.

Note that a groove for storing a sealing O-ring is formed at an upper side of the relief groove 944a, and a recess portion for supporting a return spring 949 is formed in an upper end face of the valve 944. The selector 944 is arranged to oppose a core 950 in a well known on-off type solenoid 945, to sandwich the return spring 949 therebetween. A gap between the core 950 and the selector 944 has a length larger than a diameter of the through hole 947 and the communicating holes 942, 943 and 947 cannot communicate therethrough with each other in a state wherein the selector 944 is in tight contact with the core 950. When the solenoid 945 is energized, the selector 944 is attracted to the core 950, thus interrupting communication of the communicating holes 942 and 943.

The operation of the device shown in FIG. 22 will be described.

When an idling switch 308 interlocked with an accelerator pedal (not shown) is in the ON state, i.e., in the idling mode, the control circuit 4' detects this state, and a drive circuit 4B for the switching circuit turns off the solenoid 945 of the switching device U. This state is shown in FIG. 22. The selector 944 is pressed downward by the returning force of the return spring 949, and the communicating holes 942, 943 and 947 communicate with each other.

Simultaneously, a control circuit 4A for pump controls the spill control solenoid 620 and the timing control valve 623 so that the injection rate control device 7 can obtain the proper injection rate characteristics in the injection rate control mode, thereby changing the respective positions of the spill ring 618 and a timer piston 622. According to the experimental result obtained by the present inventors, for an optimum effect, the solenoid 620 and the control valve 623 are controlled so that the spill ring 618 is located at a position at which an injection amount four times that of the conventioal device can be obtained and the piston 622 is located at a position of a crank angle advanced from a conventional injection timing by +4°.

In the case, fuel in the pressure chamber highly pressurized by the plunger 606 is supplied to the injection rate control device 7 through the communicating holes 942, 943 and 947, thus performing injection rate control as will be described later.

An electric charge proportional to the pressure of the pump chamber 602 is generated in the electrostrictive actuator 200 and a voltage is generated therefrom. Note that in order to convert the pressure of the pump chamber 602 into a compressing force, a pressure receiving area of the piston 722 is multiplied by the pressure. In the case of the device shown in FIG. 22, since the piston 722 has the pressure receiving area of about 4 cm$^2$ and the value opening pressure of each injection value 69 is set to be 100 kg/cm$^2$, a voltage generated by the electrostrictive actuator 200 is 400 V when the injection is started.

When the voltage generated from the electrostrictive actuator 200 is increased and reaches 500 V, i.e., at a predetermined timing immediately after the injection valves begins injecting, the control circuit 4' short-circuits the electrostrictive actuator 200 so as to decrease the voltage to 0 V. At this time, since the electrostrictive actuator 200 is constricted by about 50 $\mu$m, the variable volume chamber 626 is expanded by 4 cm$^2 \times$ 50 $\mu$m = 20 mm$^3$. Therefore, the pressure of the pump chamber 602 is decreased. In this case, injection from the injection valves is temporarily interrupted, thus realizing pilot injection. The actuator 200 is short-circuited up to an intake step of the pump chamber, i.e., a given timing when the plunger moves to the left.

A signal generated at a timing for releasing short-circuiting of the actuator 200 and open-circuiting it is controlled by the control circuit 4' in accordance with a signal supplied from an ATDC sensor for detecting a 60° crank angle after a compression upper dead point of each engine cylinder. Such a signal can be generated by a magnetic resistance element (MRE) or magnetic pickup (MPU).

Next, a case will be described wherein a load is applied to an engine, i.e., the idling switch 308 is turned off by depressing the accelerator pedal.

In this case, the drive circuit 4B for the switching device supplies power to the switching device U. The switching device U is supplied with power during an OFF period of the idling swich 308. Thus, a magnetic field is generated in the solenoid 945, and the selector 944 is brought into tight contact with the core 950 against the biasing force of the return spring 949. Thus, the communicating holes 942 and 943 are shielded by the selector 944. At this same time, since the idling switch 308 is turned off, the control circuit 4A for the fuel injection pump controls the spill control solenoid 620 and the timing control valve 623 so that the spill ring 618 and the piston 622 are returned to their normal positions. Since the pressure chamber 602 does not communicate with the variable volume chamber 726 of the injection rate control device 7, the engine can be driven in accordance with the normal proper injection amount and injection timing.

A drive circuit 100B for controlling the injection rate in the control circuit 4' in the device shown in FIG. 22 will be described hereinafter.

Figure 23:
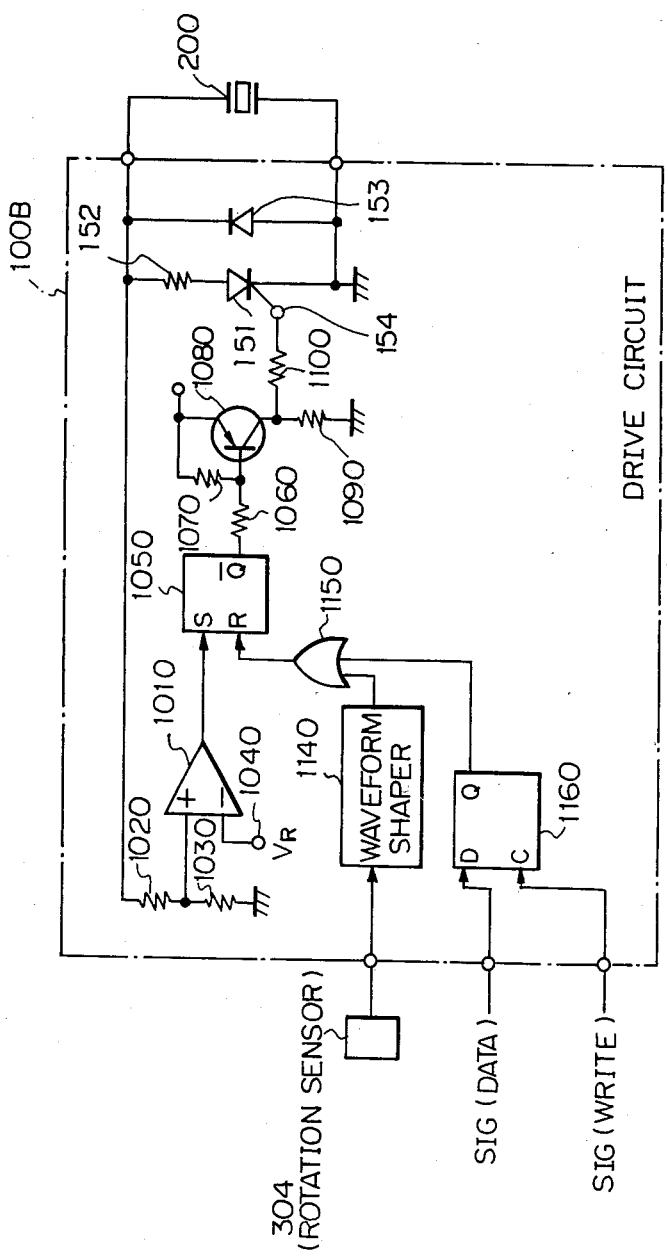
FIG. 23 is a circuit diagram of a drive circuit applied to the device shown in FIG. 22.

FIG. 23 shows a circuit diagram of the drive circuit 100B in the control circuit 4'. Reference numeral 1010 denotes a comparator having the noninverting input terminal connected to a terminal voltage of the electrostrictive actuator 200, which is divided by resistors 1020 and 1030. The inverting input terminal of the comparator 1010 is connected to a reference voltage source 1040. When the terminal voltage of the electrostrictive actuator 200 exceeds 500 V, the output from the comparator 1010 goes to "1" level.

The output from the comparator 1010 is connected to a set input of a flip-flop 1050. The flip-flop 1050 is a reset priority type. When a reset input is at logic level "1", a $\overline{Q}$ output is always at logic level "1". Only when the rest input is at logic level "0", does the $\overline{Q}$ output reach the "0" level. The signal from the $\overline{Q}$ ouptut is suppleid to the base of a transistor 1080 through resistors 1060 and 1070, thus turning on/off the transistor 1080. The transistor 1080 is grounded thorugh a resistor 1090, a collector signal therefrom is supplied to the gate input 154 of a thyristor 151 through a resistor 1100.

The thyristor 151 is connected in parallel with the electrostrictive actuator 200 through a small resistor 152. When the gate input of the thyristor 151 is at "1"level, the thyristor 151 is rendered conductive, thus short-circuiting the electrostrictive actuator 200. The anode side of a diode 153 is grounded and the cathode side thereof is connected to the high voltage side of the electrostrictive actuator, i.e., the diode 153 is reverse-biased, to protect the electrostrictive actuator 200, to supply an electric charge to the actuator 200 and thereby extending its original length.

Reference numeral 304 denotes a rotation sensor, e.g., using an MRE, for generating a signal in synchronism with an ATDC60° signal of each engine cylinder (not shown). The output from rotation sensor 304 is supplied to a waveform-shaper 1140 and generates "1" level pulses in synchronism with the ATDC60° signal of each engine cylinder. The output from the waveform-shaper 1140 is supplied to one input of a 2-input OR gate 1150. Since the 2-input OR gate 1150 is connected to the reset input of the flip-flop 1050, if one of the inputs of the OR gate 1150 is at "1" level, the flip-flop 1050 is reset and the $\overline{Q}$output goes to "1" level, thus enabling the thyristor 1110.

A latch circuit 1160 latches engine conditions discriminated by a CPU 420 (to be described later). A data input D of the latch circuit 1160 is connected to a data signal line SIG(DATA) on bus line 419, and a clock input C is connected to a write signal line SIG(WRITE) on the bus line 419. When the engine speed exceeds 1,200 rpm or when the idling switch is turned off, the CPU 420 determines inhibition of pilot control and supplies a "1" level signal to the latch circuit 1160. When a Q output of the latch circuit 1160 goes to "1" level, the fip-flop 1050 is continuously reset through the 2-input OR gate 1150. Therefore, the thyristor 151 is not triggered and pilot control is not performed.

The operation of the drive circuit 100B with the above arrangement will be described with reference to a timing chart shown in FIG. 24. Referring to FIG. 24, chart (1) represents the ATDC60° signal; (2), a cam lift; (3), the pressure of the pump chamber; (4), a terminal voltage of the electrostrictive actuator 200; (5), the output from the comparator 1010; (6), the $\overline{Q}$ output of the flip-flop 1050; and (7), a load discrimination signal.

Now the operation will be described assuming that the engine is in the idling mode. The cam is lifted upon rotation of the pump drive shaft (FIG. 24(2)), and the pressure of the pump chamber 602 is increased (FIG. 24(3)). In response to this, the electrostrictive actuator 200 is compressed, thereby generating a voltage (FIG. 24(4)). The voltage generated from the actuator 200 is divided by the resistors 1020 and 1030 and the divided voltage is compared with the reference voltage by the comparator 1010. When the terminal voltage of the electrostrictive actuator 200 exceeds 500 V, the output from the comparator 1010 reaches the "1" level (FIG. 24(5). The flip-flop 1050 is inverted and the $\overline{Q}$ reaches the "0" level (FIG.24(6)). Since the $\overline{Q}$output enables the transistor 1080 through the resistors 1060 and 1070, the thyristor 151 is triggered and is rendered conductive, thus short-circuiting the electrostrictive actuator (FIG. 24(4)). Thus, the terminal voltage of the electrostrictive actuator 200 is rapidly decreased to 0 V, and the actuator 200 is constricted. Therefore, the pressure of the pump chamber is decreased and injection is interrupted (FIG. 24(3)). Since the cam lift is in the course of lifting, fuel is further supplied by pressure. Therefore, the pressure of the pump chamber is increased again, thus resuming injection (FIG. 24(3)). However, the thyristor 151 is continuously conductive until the flip-flop 1050 is reset. Before the cam lift reaches an upper dead point, the above-mentioned spill port is open and the pressure of the pump chamber is spilled. Thus, the pressure of the pump chamber is decreased, thereby ending injection.

At this time, the terminal voltage of the electrostrictive actuator 200 is to be decreased to a negative value, as indicated by the dotted line of FIG. 24(4). Since the terminal voltage of the actuator 200 is negatively large, polarization of the actuator 200 may be disturbed. For this reason, the diode 1130 short-circuits a reverse voltage, thus protecting the actuator 200.

When the engine rotates to an angle of ATDC60°, the rotation sensor 304 generates a signal, and the signal is converted into a pulse signal by the waveshaper 1140 (FIG. 24(1)). Since the pulse signal resets the flip-flop 1050 through the 2-input OR gate 1150, the $\overline{Q}$output is set at the "1" level (FIG. 24(b)), and the thyristor 151 is turned off, thus ending one cycle of injection.

Figure 25B:
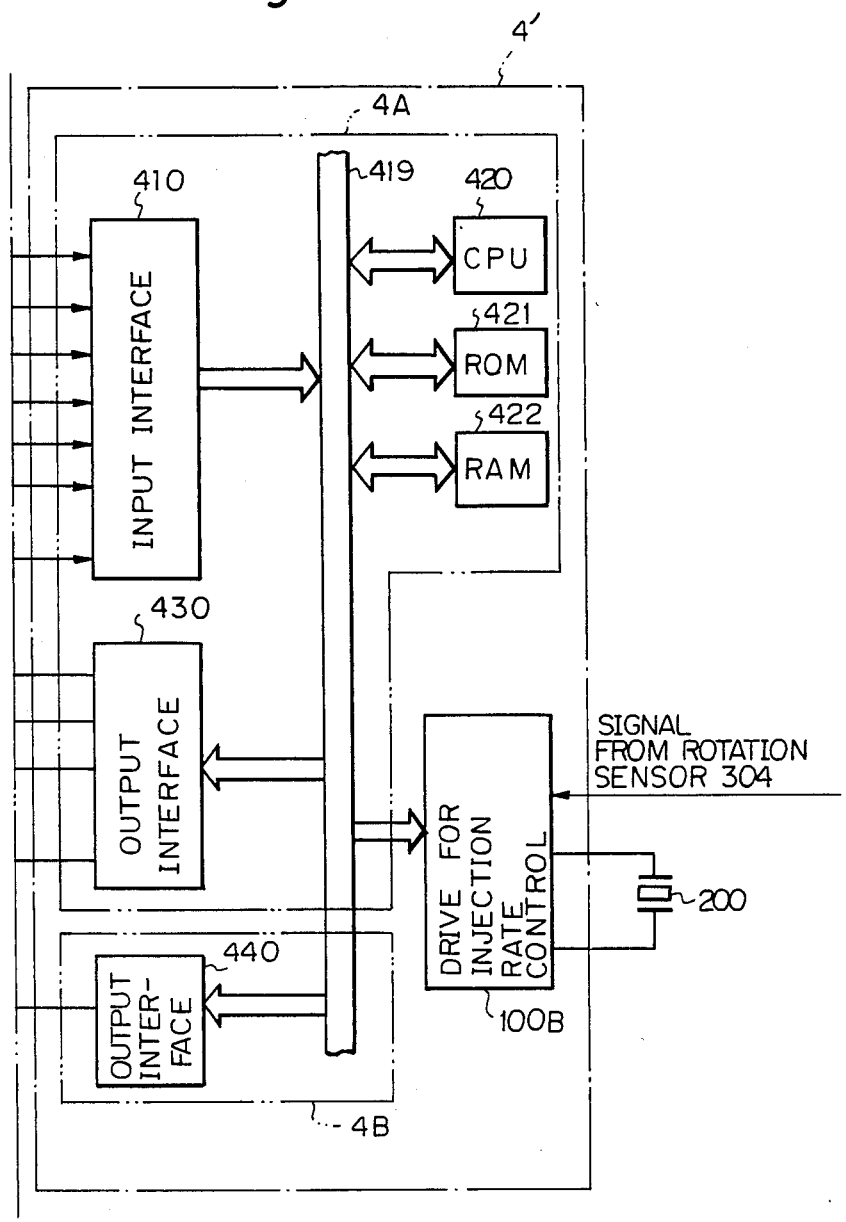

The arrangement and the operation of the control circuit 4' will be described with reference to FIG. 25.

The control circuit 4' comprises the drive circuit 100B, the drive circuit 4B for the switching device and the control circuit 4A for the pump. The control circuit 4A detects engine driving conditions and controls the fuel injection pump by calculating a predetermined injection amount and timing.

An input interface 410 receives signals from a water temperature sensor 302, an intake-air pressure sensor 309, an accelerator pedal position sensor 301 and the like in addition to those from an idling switch sensor 308, the rotation sensor 304, a spill position sensor 310 and a timer position sensor 311. The input interface 410 A/D converts the received signals as needed, and supplies them to the bus line 419. Reference numeral 420 denotes a cental processing unit (CPU) for calculating the injection amount and the injection timing. Reference numeral 421 denotes a read-only memory (ROM) storing a program and various data; and 322, a random-access memory (RAM) for calculating and storing data.

An output interface 430 generates a signal in accordance with data calculated by the CPU 420 to control actuators such as the spill control solenoid 620, the timer control valve 623, a fuel cut solenoid and the like.

The drive circuit 4B for the switching device U will be described hereinafter. Reference numeral 440 denotes a second output interface connected to the bus line 419. When the CPU 420 generates resultant data of idling mode discrimination, the second output interface 440 powers the solenoid 945 of the switching device U.

Since the drive circuit 100B has been described with reference to FIG. 23, a detailed description thereof is omitted. As described above, the drive circuit 102 is controlled in accordance with the discrimination result from the CPU 420 concerning whether or not the injection rate control is performed.

Figure 26C:
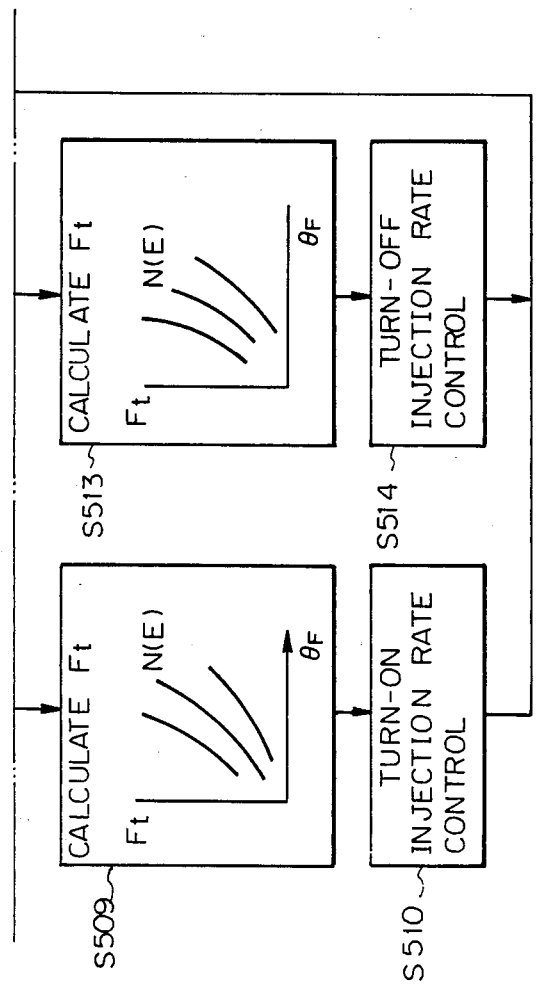

The operation of the control circuit 4' with the above arrangement will be described with reference a flow chart shown in FIG. 26.

A control routine of the control circuit 4' is activated by timer interruption at 10 ms intervals. In steps S500 and S501, an engine speed signal N(E) and an accelerator pedal position signal SIG(ACC) are fetched from the input interface 410. In step S502, a fundamental injection amount $Q_B$ is calculated referring to a map stored in the ROM 421 in accordance with the signals N(E) and SIG(ACC). Similarly, in step S503, a fundamental injection timing $\theta_i$ is calculated. In step S504, correction data such as water temperature data and intake-air pressure data are fetched and data $Q_B$ and $\theta_i$ are corrected with reference to a correction map stored in the ROM 421 in accordance with the fetched data, thereby calculating optimum injection amount $Q_F$ and injection timing $\theta_F$. It is checked in steps S505 and S506 if the idling switch is turned on, and if the engine speed N(e) is equal to or lower than 1,200 rpm. That is, in steps S505 and S506, only when the idling switch is turned on and the engine speed N(E) is equal to or lower than 1200 rpm, the engine is determined to be in the idling state. In this case the flow advances to step S507 and pilot injectin rate control is perfored. Otherwise, the flow advances to step S511 and normal injection rate control is performed.

It it is determined that the engine is in the idling mode, a signal for turning on the solenoid 945 of the switching device U is supplied to the output interface 440 in step S507. In step S508, in order to compensate for a decrease in injection amount an delay in injection timing in the pilot injection rate control, a drive output $I_s$ of the spill control solenoid 620 corresponding to the injection amount $Q_F$ is calculated from a special-purpose injection amount map for the pilot inejction rate control. Similarly, in step S509, a drive output $F_t$ of the timer control valve 623 corresponding to the injection timing $\theta_i$ is calculated from a special-purpose injection timing map for the pilot injection rate control. In step S510, an On signal is supplied to the drive circuit 102, thus allowing the circuit 102 to effectively trigger the thyristor.

On the other hand, if it is determined the engine is not in the idling mode, a signal for turning off the solenoid 945 of the switching device U is supplied to the output interface, thereby disabling the pilot injection rate control. In step S512 and S513, with reference to special-purpose injection amount and injection timing maps used when the pilot injection rate control is not performed, the drive outputs $I_S$ and $F_t$ of the spill control solenoid 620 and the timer control valve 623 respectively corresponding to the injection amound $Q_F$ at the injection timing $\theta_i$ are calculated, respectively. An OFF signal is supplied to the drive circuit 102 to inhibit the pilot injection rate control.

In step S515, the drive output $I_s$ of the spill control solenoid 620 calculated in step S508 or S512 is generated, and in step S516, the drive output $F_t$ of the timer control valve 623 calculated in step S509 or S513 is generated, thus returning to the main routine. In accordance with the outputs $I_s$ and $F_t$, the fuel injection pump is controlled by hardware in the output interface, thus providing the predetermined injection amount and injection timing.

Figure 27B:
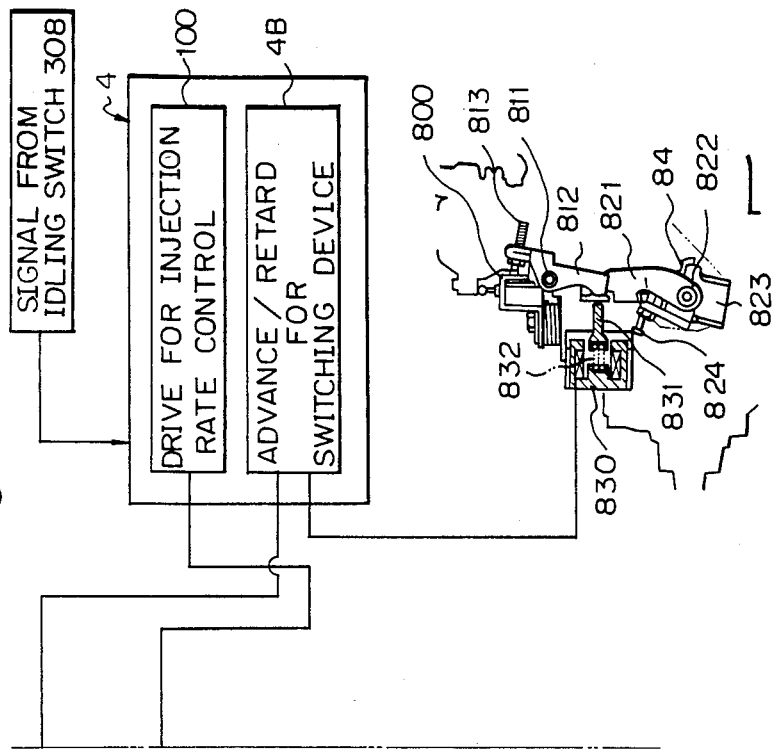

A case will be described with reference to FIGS. 27A and 27B when a mechanical type fuel injection pump according to still another embodiment of the present invention is used.

A switching device U is arranged between a pump chamber 602' and an injection rate control device 7.

In order to compensate for a decrease in injection amount and a delay in the injection timing in the case of injection rate control, a well known idle adjustment/external advance device is used as an injection amount/injection timing control device.

Figure 28A:
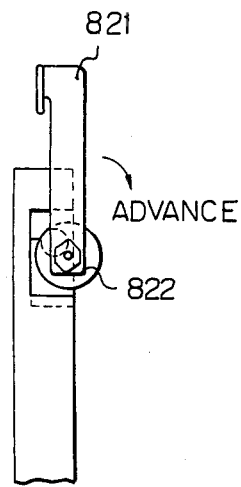
FIGS. 28A and 28B are views showing an adjusting lever of the fuel injection pump.
Figure 28B:
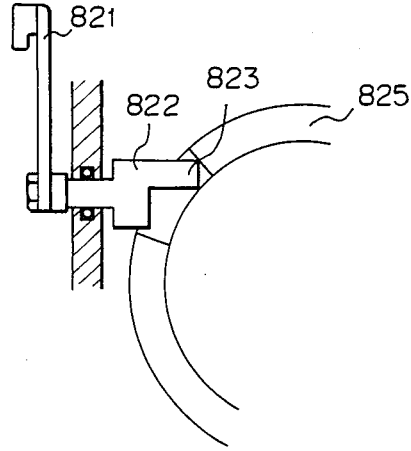

An adjustment lever 800 of a fuel injection pump P is brought into contact with an increase lever 812 which is fixed pivotally about a fulcrum 811, and an advance lever 821 is arranged integrally with an eccentric shaft 822. As shown in FIG. 28A, when the advance lever 821 is pivoted clockwise in FIG. 28A, an eccentric portion 823 of the eccentric shaft 822 causes a roller ring 825 to be rotated, thus performing timing control. An increase adjustment screw 813 adjusts an injection amount increase of the increase lever 812. When the screw 813 is tightened, the injection amount is increased. An advance adjustment screw 824 is fixed to a fixing plate 823 in the vicinity of the advance layer 821. When the screw 824 is tightened with reference to the fixing plate 823, it can be adjusted to be advanced.

A solenoid rod 830 has a push rod 831. When the rod 830 is not energized, it pushes the rod 831 by a returning force of a return spring 832, thereby pivoting the increase and advance levers 812 and 821 to desired positions.

Therefore, the same effect can be obtained as in the above embodiment. When the idling switch 308 detects the idling mode, the solenoid 945 and the solenoid rod 831 of the switching device U are not energized. For this reason, in the switching device U, the communicating holes 942, 943 and 947 communicate with each other, and the injection rate control device 7 performs desired pilot injection rate control by the drive circuit 100. Simultaneously, since the increase and advance levers 812 and 821 are pushed by the push rod 831, the increase lever 812 can pivot the adjustment lever 800 to a predetermined position and the advance lever 821 can pivot the roller ring 825 to a predetermined position, thus maintaining the injection amount and the injection timing required for the injection rate control.

On the contrary, when the accelerator pedal is depressed and the idling switch 308 is turned off, since the solenoid 945 of the switching device U are energized, in the switching device U, communication between the communicating holes 942 and 943 is interrupted by the switching valve 944. The increase and advnace levers 921 and 812 are returned to their original positions, thereby providing the normal injection amount and injection timing of the fuel injection pump.

The idling switch 308 in the above embodiment need not be a one-point detection switch but can be a switch such as a potentiometer whose output is continuously changed. In addition to this, the injection rate control is not limited to the idling mode, but can be performed at a desired load and engine speed.

Figure 29:
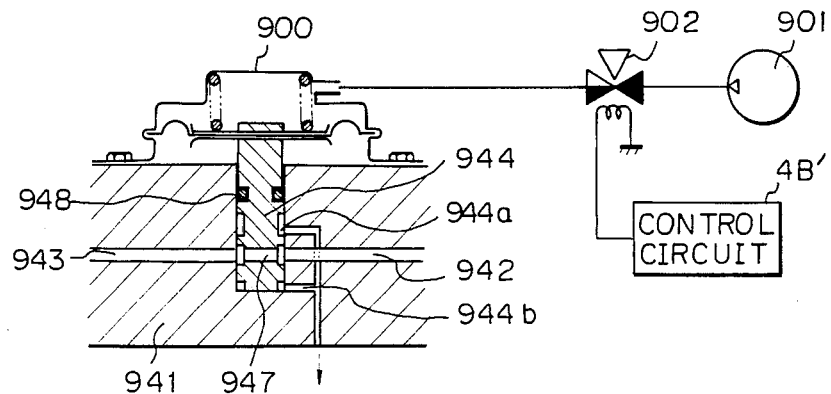
FIG. 29 is a view showing a switching device using a negative pressure valve.

The solenoid 945 in the switching device U of the device shown in FIG. 22 or FIG. 27 can be arranged in such a manner that a diaphragm 900 and a negative pressure valve by combining a vacuum pump 901 and vacuum switching valve controlled by the control circuit 4B are used, as shown in FIG. 29.

Figure 30:
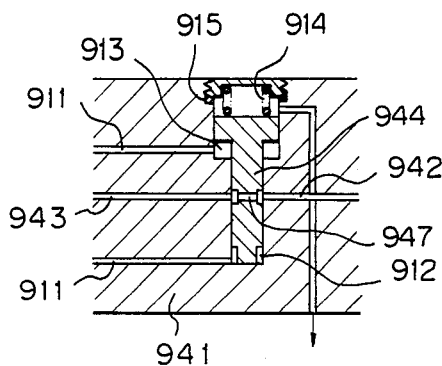
FIGS. 30 and 31 are views showing an example of a switching mechanism of the switching device.

The switching device can be switched by introducing a fuel pressure generated in the low pressure chamber 611 of the injection pump because the fuel pressure is increased in accordance with an increase in load and engine speed, as shown in FIG. 30. In this case, the pump internal pressure is introduced from the low pressure chamber 611 to pressure receiving chambers 912 and 913 through two paths 911. When a preset load of the return spring 914 is set to be slightly larger than a total pressure of the pressur receiving chambers 912 and 913 obtained in the idling mode, the communicating holes 942, 943 and 947 communicate with each other in the idling mode, as shown in FIG. 30, thus enabling the injection rate control. When the load is increased and the fuel pressure in the chamber 611 is also increased, since the total pressure of the pressure receiving chamber 912 and 913 exceeds the preset load of the return spring 914, the selector 944 moves upward, thus interrupting the communication of the communicating holes 942 and 943. Therefore, the same function as in a normal injection pump can be obtained.

Figure 31:
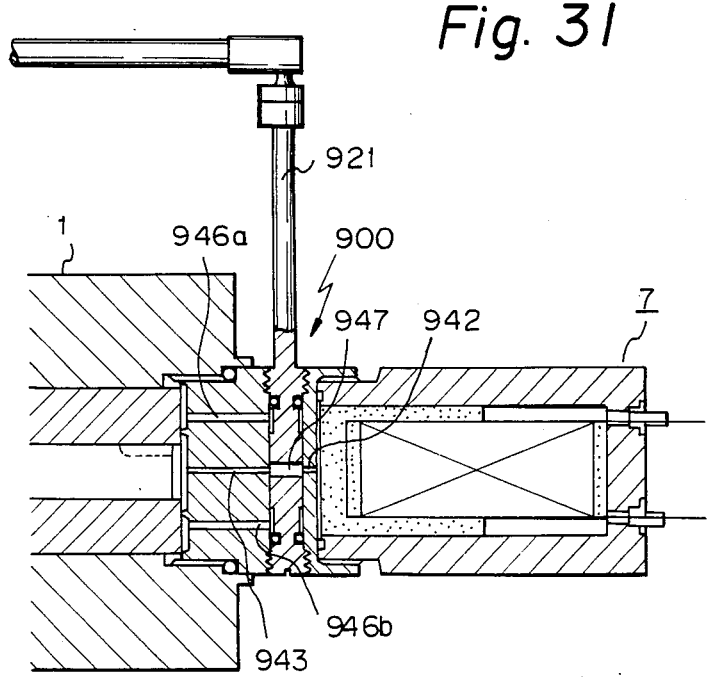

The selector 944 can be a pivotal rotary valve 900 shown in FIG. 31. In this case, when the selector 944 is pivoted by a certain angle, the communicating holes 942 and 943 communicate with each other. When the selector 944 is further pivoted, the communicating holes 942 and 943 are interrupted. This pivotal movement is performed by a link 921 interlocked with the accelerator pedal, as shown in FIG. 31, and the link 921 is set so that the communicating holes 942, 943 and 947 communicate with each other at an idle position. The rotary valve can be pivoted by an electronic rotating means, such as a DC motor, stepping motor and the like.

The solenoid rod of the device shown in FIG. 27 can be divided for increase and advance solenoid rods and actuators therefor can be provided. As described in the switching device of FIG. 29, the method of using the diaphragm or the link mechanism in place of the solenoid is known to those skilled in the art.

Figure 32:
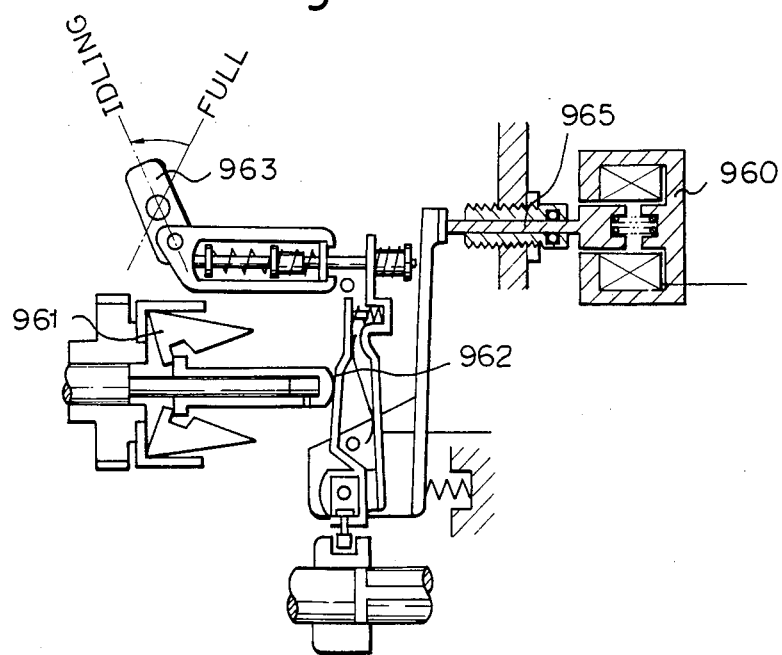
FIGS. 32 and 33 are views showing an example of a fuel injection amount/timing correction mechanism.

Furthermore, in order to increase the injection amount in the idling mode, an injection amount correction device can be used wherein a full-load stopper (smoke set) 965 provided in a conventional injection pump shown in FIG. 32 is formed to be a double structure, and the full-load stopper 965 is pushed by a correction solenoid 960. Referring to FIG. 32, reference numeral 961 denotes a fly weight; 962, a control lever; and 963, an adjusting lever.

Figure 33:
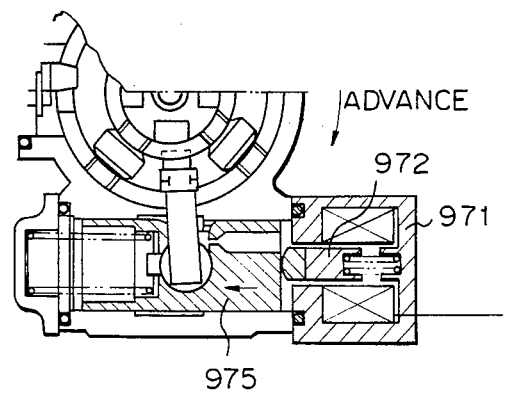

Similarly, in timing control, an injection timing correction device can be used wherein a timer piston 975 is controlled by a timing control solenoid 971 and a rod 972, as shown in FIG. 33.

Figure 34:
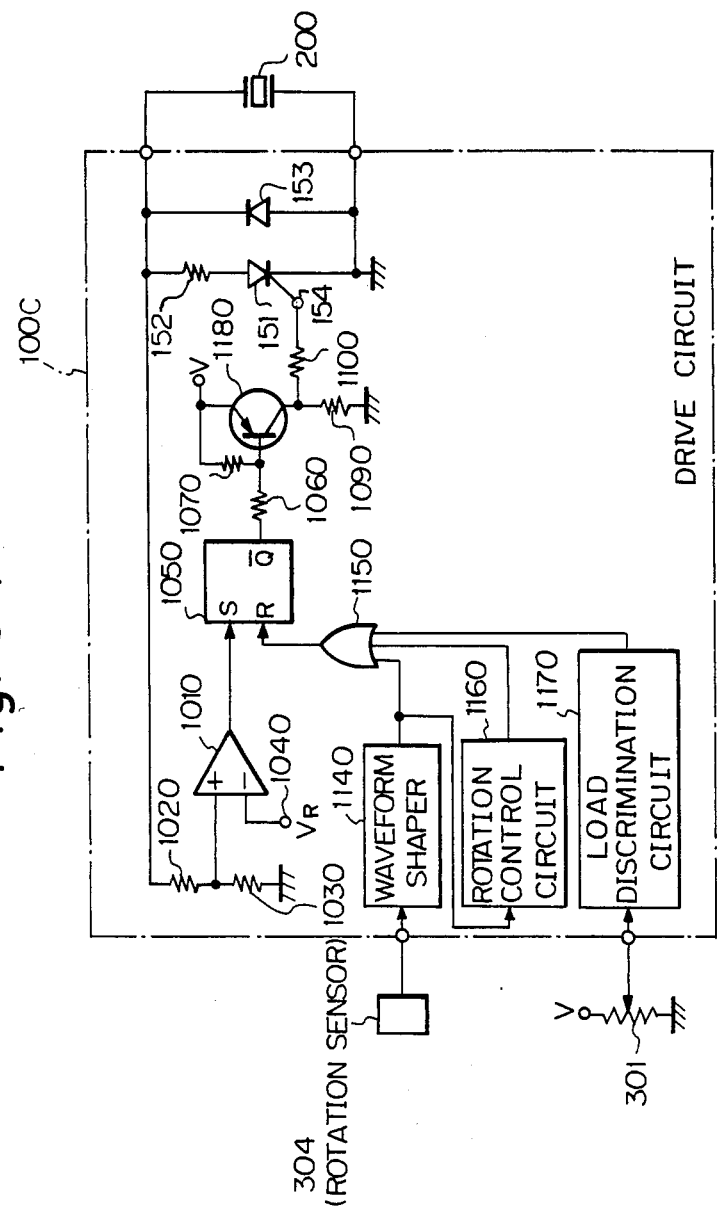
FIG. 34 is a circuit diagram of a drive circuit according to still another embodiment of the present invention.

Embodiment shown in FIG. 34

FIG. 38 shows a drive circuit 100C according to still another embodiment. In FIG. 34, reference numeral 1010 denotes a comparator. A terminal voltage of an electrostrictive actuator 200 which is divided by resistors 1020 and 1030 is supplied to the non-inverting input terminal of the comparator 1010. The inverting input terminal of the comparator 1010 is connected to a reference voltage source 1040. When the terminal voltage of the electrostrictive actuator exceeds 500 V, the output from the comparator 1010 goes to "1" level.

The output from the comprator 1010 is connected to a set input of a flip-flop 1050. The flip-flop 1050 is a reset priority type. When a reset input of the flip-flop 1050 is at "1" level, a $\overline{Q}$ output is continuously at "1" level. Only when the reset input is at "0" level, does the $\overline{Q}$ output reach the "0" level. The signal from the filp-flop 1050 is supplied to the base of a transistor 1080 through resistors 1060 and 1070, thus turning on/off the transistor 1080. The emitter of the transistor 1080 is grounded through a resistor 1090, and a collector signal therefrom is supplied to the gate input 154 of a thyristor 151 through a resistor 1100.

The thyristor 151 is connected in parallel with the electrostrictive actuator 200 through a small resistor 152. When the gate input of the thyristor 151 is at the "1" level, the thyristor 1110 is rendered conductive, thus short-circuiting the electrostrictive actuator 200. The anode side of a diode 1130 is grounded and the cathode side thereof is connected at a high voltage side of the electrostrictive actuator 200, i.e., the diode 1130 is reverse-biased. The diode 153 protects the electrostrictive actuator 200 from a reverse voltage.

Reference numeral 304 denotes a rotation sensor, using, e.g., an MRE, for generating a signal in response to an ATDC60° signal of each cylinder. The output from the rotation sensor 304 is supplied to a waveform-shaper 1140, and generates "1" level pulses in response to the ATDC60° signal of each cylinder. The output from the waveform-shaper 1140 is connected to one input of a 3-input OR gate 1150. Since the 3-input OR gate 1150 is connected to the reset input of the flip-flop 1050, if at least one of the inputs of the 3-input OR gate 1150 is at the "1" level, the flip-flop 1050 is reset. Thus, the $\overline{Q}$ output of the flip-flop 1050 reaches the "1" level and the thyristor 151 is enabled.

The output from the waveform-shaper 1140 is also connected to rotation control circuit 1160. When the engine speed is equal to or higher than 1,200 rpm, the circuit 1160 generates a "1" level rotation discrimination signal, and otherwise, it generates a "0" level rotation discrimination signal. The rotation discrimination signal is supplied to the 3-input OR gate 1150.

Reference numeral 301 denotes a potentiometer, interlocked with an accelrator pedal (not shown), for generating a voltage signal in accordance with a load. The voltage signal is supplied to a load discrimination circuit 1170. When an accelerator pedal stroke is equal to or more than 20%, the circuit 1170 generates a "1" level load discrimination signal, and otherwise, it generates a "0" level load discrimination signal. The load discrimination signal is also supplied to the 3-input OR gate 1150.

The operation of the drive circuit 100C with the above arrangement will be described with reference to a timing chart shown in FIG. 24.

The operation of the drive circuit, assuming that the engine is in the low speed and low load state, is similar to the operation of the drive circuit 100B shown in FIG. 23. The detailed description thereof is omitted.

A method will be described wherein the electrostrictive actuator 200 is not short-circuited in accordance with engine conditions.

If the engine is in, e.g., a high load state, the output voltage from the potentiometer 301 becomes high, and the load discrimination circuit 1170 generates a "1" level signal when the current load is higher than the preset load (FIG. 24(7)). The load discrimination signal resets the flip-flop 1050 through the 3-input OR gate 1150. That is, when the load is high, since the flip-flop 1050 is always reset, the thyristor 151 is not enabled irrrespective of an absence/presence of the set signal from the comparator 1010, and the electrostrictive actuator 200 is kept open-circuited. Similarly, the engine rotation discrimination circuit 1160 discriminates the engine speed based upon a signal from the rotation sensor. When the engine speed is higher than a preset speed, the rotation discrimination signal reaches the "1", level and the flip-flop 1050 is continuously reset. Thus, the electrostrictive actuator 200 is maintained to be open-circuited.

The above-mentioned drive circuit 100C short-circuits the electrostrictive actuator 200 at a predetermiend timing. However, the present invention is not limited to this. The drive circuit 100C can be replaced with another circuit arrangement which can provide the same operation.

Figure 36:
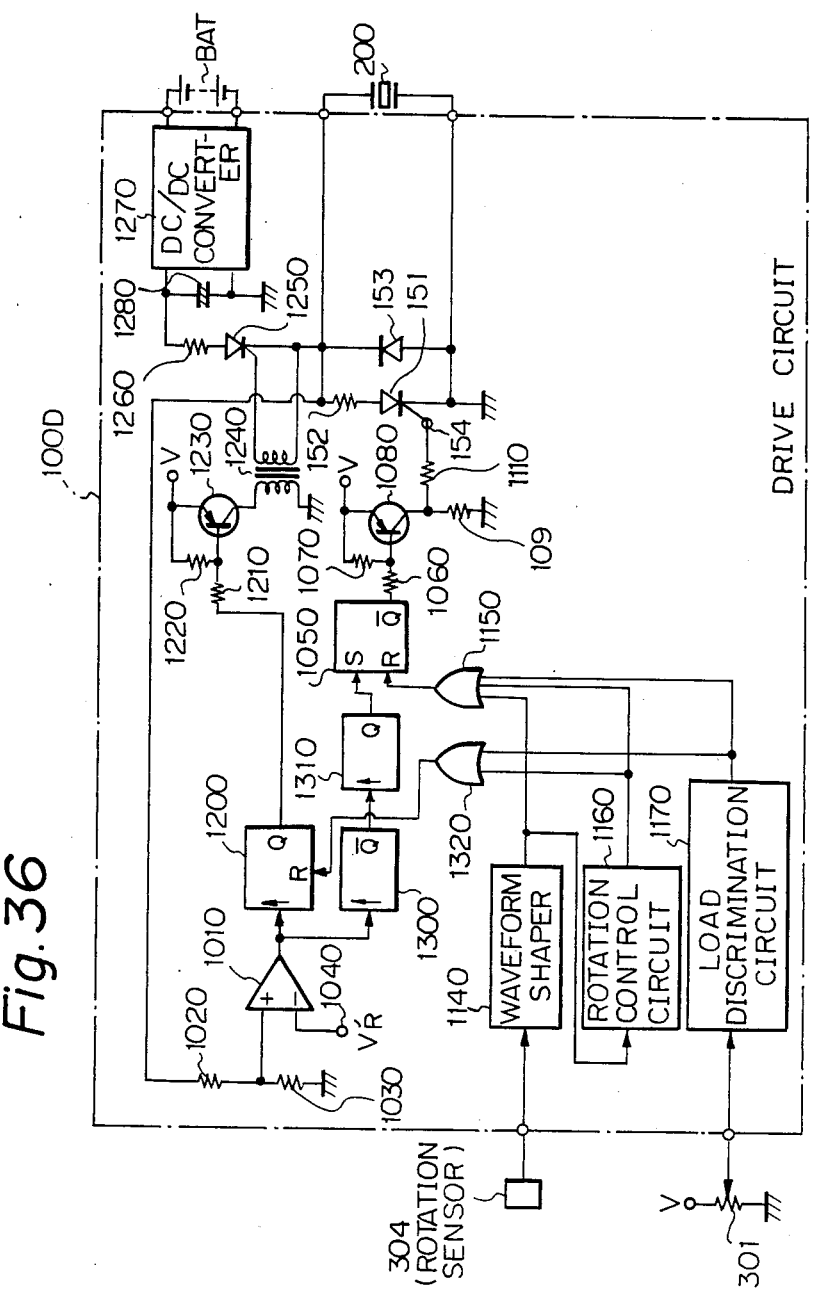
FIG. 36 is a circuit diagram of a drive circuit according to still another embodiment of the present invention.

Embodiment shown in FIG. 36

A drive circuit 100D according to still another embodiment of the present invention will be described with reference to FIGS. 35 and 36.

Figure 35:
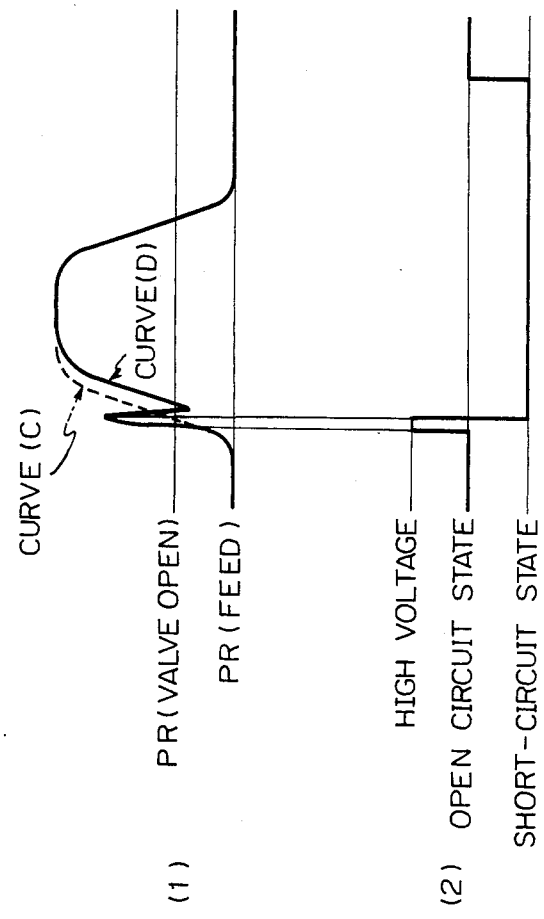
FIG. 35 is a waveform chart for explaining the operational characteristics of the drive circuit.

An operation of the drive circuit 100D is as shown in FIG. 35. As shown in FIG. 35, when the pressure of the pump chamber is slightly lower than the valve opening pressure, i.e., reaches 80 kg/cm$^2$, this state can be detected because the voltage generated from the electrostrictive actuator 200 has reached 320 V. Thus, a high voltage of 820 V is applied to the electrostrictive actuator 200 for a period of 104 μsec. The electrostrictive actuator 200 is extended by 50 μm, and the variable volume chamber 26 is contracted by 4 cm$^2$×50 μm=20 mm$^3$. Thereafter, when the drive circuit 104 short-circuits the electrostrictive actuator 200, the actuator 200 is constricted by a total length of 82 μm (50 μm: by releasing the high voltage, and 32 μm: by short-circuiting the electrodes), thereby expanding the variable volume chamber 26 by 4 cm$^2$×82 μm=32.8 mm$^3$. In this manner, the pressure of the pump chamber 602 represents a curve CURVE(D) shown in FIG. 35(1). In this case, pilot injection can be more effectively performed as compared to the above embodiments. Since pilot injection involves a large injection pressure, fuel can be vaporized better than in the above embodiment.

The drive circuit 100D will be described with reference to FIG. 36. Since the parts indicated by the same reference numerals as in FIG. 34 are similarly operated, a detailed description thereof is omitted. Reference numeral 1200 denotes a first one-shot circuit which is triggered in synchronism with a leading edge of the comparator 1010 so as to generate a "0" level pulse signal having a pulse width of 20 μsec from the Q output. The pulse signal turns on/off the transistor 1230 through resistors 1210 and 1220.

The collector of the transistor 1230 is connected to the primary coil of a pulse transformer 1240. When the transistor 1230 is enabled, a voltage is induced in the secondary coil of the pulse transformer 1240. The secondary coil of the pulse transistor 1240 is connected to the gate input of a thyristor 1250 to trigger the thyristor 1250. The anode of the thyristor 1250 is connected through a current limit resistor 1260 to a capacitor 1280 which is charged by a voltage from a DC/DC converter 1270. The cathode of the thyristor 1250 is connected to the electrostrictive actuator 200. The DC/DC converter 1270 boosts a low voltage from a battery BAT to the high voltage of 820 V, and the capacitor 1280 supplies a large transient current when the thyristor 1250 is turned on.

Reference numeral 1300 denotes a second one-shot circuit which is triggered in synchronism with rising of the comparator 1010 to generate a "0" level pulse signal having a pulse width of 100 μsec. The pulse signal is supplied to a trigger input of a third one-shot circuit 1310. The third one-shot circuit 1310 is triggered in synchronism with the trailing edge of the output from the second one-shot circuit 1300 and generates a "1" level pulse signal having a pulse width of 10 μsec. The Q output of the third one-shot circuit 1310 is connected to the set input of the flip-flop 1050.

Reference numeral 1320 denotes a 2-input OR gate. The OR gate 1320 logically ORs the outputs from an engine speed discrimination circuit 1160 and a load discrimination circuit 1170, and the resultant signal is supplied to the reset input of the first one-shot circuit. When the engine conditions are in the high speed or high load state, the output from the 2-input OR gate 1320 reaches the "1" level, thus resetting the first one-shot circuit. For this reason, no output is generated from the first one-shot circuit and the thyristor 1250 is not triggered. Therefore, the high voltage 820 V is not applied to the electrostrictive actuator 200. Furthermore, as has been described in the above embodiment, since the flip-flop 1050 is also reset, the thyristor 151 is disabled and an electric charge is not discharged from the electrostrictive actuator 200.

The operation of the drive circuit 100D will be described in more detail with reference to a timing chart of FIG. 37.

Figure 37:
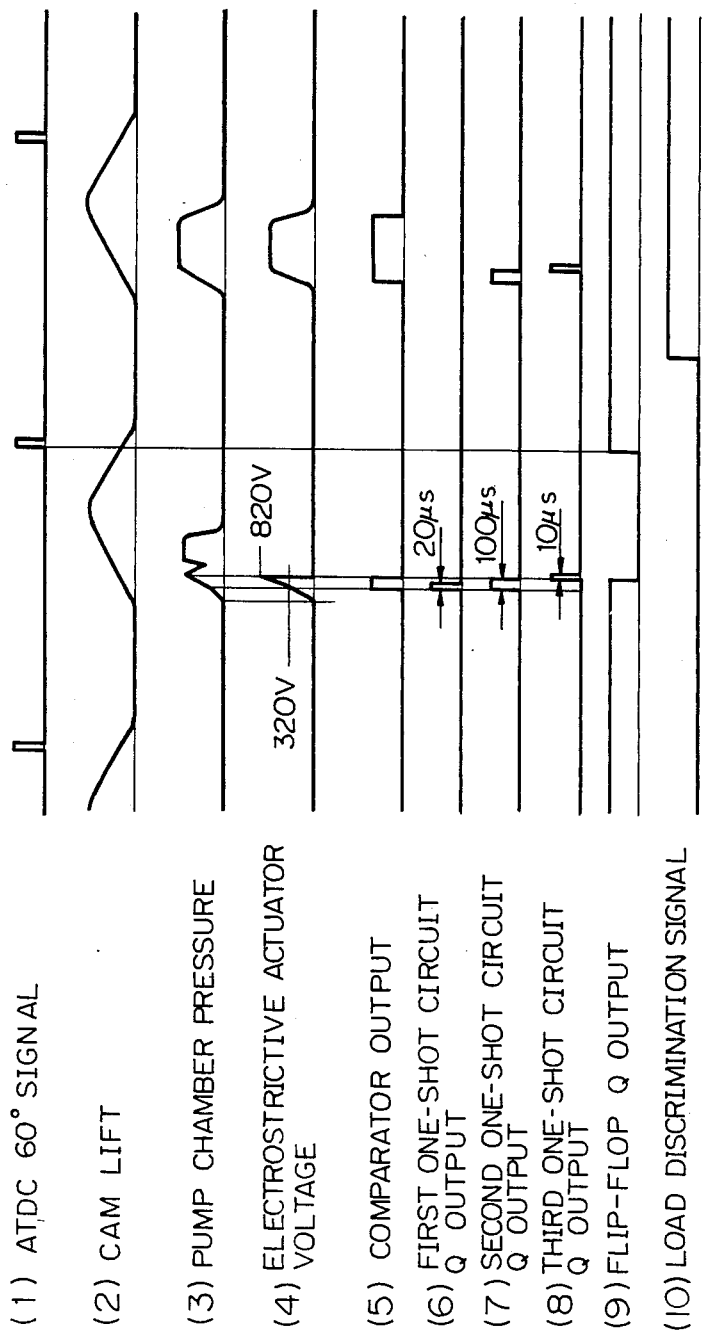
FIG. 37 is a waveform chart for explaining the operational characteristics of the circuit shown in FIG. 36.

Referring to FIG. 37, chart (1) represents the ATDC60° signal; (2), the cam lift; (3), the pressure of the pump chamber; (4), the terminal voltage of the electrostrictive actuator; (5), the output from the comparator 1010; (6), the Q output of the first one-shot circuit 1200; (7), the Q output of the second one-shot circuit 1300; (8), the Q output of the third one-shot circuit 1310; (9), the Q output of the flip-flop 1050; and (10), the load discrimination signal.

The operation will be described assuming that the engine is in the low speed and low load state. The cam is lifted upon rotation of a pump drive shaft (FIG. 37(2)), and the pressure of the pump chamber is increased (FIG. 37(3)). Thus, the electrostrictive actuator 200 generates a voltage (FIG. 37(4)). The voltage generated from the actuator 200 is divided by the resistors 1020 and 1030 and the divided voltage is compared with the reference voltage by the comparator 1010. When the terminal voltage of the electrostrictive actuator 200 exceeds 320 V, the output from the comparator 1010 reaches the "1" level (FIG. 37(5)), thus triggering the first and second one-shot circuits 1200 and 1300. Since the reset input of the first one-shot circuit 1200 is at "0" level, the pulse signal having the 20-μsec pulse width appears at the Q output thereof (FIG. 37(6)). The pulse signal turns on the transistor 1230 through the resistors 1210 and 1220. Then, a current flows in the primary coil of the pulse transformer 1240, and the thyristor 1250 is triggered by a voltage induced in the secondary coil of the transformer 1240. The voltage of 820 V charged in the capacitor 1280 by the DC/DC converter 1270 to 820 V is supplied from the capacitor 1280 to the electrostrictive actuator 200 (FIG. 37(4)). Thus, since the electrostrictive actuator 200 is extended and the pressure of the pump chamber is increased (FIG. 37(3)), fuel is injected. The thyristor 1250 is automatically disabled when the electrostrictive actuator 200 is charged to 820 V.

On the other hand, the "0" level pulse signal having the 100-μsec interval appears at the Q̄ output of the second one-shot circuit 1300 (FIG. 37(7)), thus triggering the third one-shot circuit 1310. The "1" level signal having the 10-μsec pulse width is generated from the Q output of the third one-shot circuit 1310 (FIG. 37(8)). Thus, the flip-flop 1050 is reset when 100 μsec has elapsed from rising of the comparator 1010 (FIG. 37(9)). When, the thyristor 151 is rendered conductive and the electrostrictive actuator 200 is short-circuited (FIG. 37(4)). Then the actuator 200 is short-circuited, since it is constricted, the pressure of the pump chamber is decreased and injection is interrupted (FIG. 37(3)). Thereafter, the same operation as in the above embodiment is repeated.

In the high speed or high load state, since the output from the engine speed discrimination circuit 1160 or the load discrimination circuit 1170 reaches the "1" level, the output from the 2-input OR gate 1320 reaches the "1" level. Thus, the first one-shot circuit 1200 is reset and the thyristor 1250 is not triggered. Similarly, since the reset input of the flip-flop 1050 reaches the "1" level, the thyristor 1110 is not triggered. That is, the electrostrictive actuator 200 is kept open-circuited.

In the above embodiment, after the high voltage is once applied to the electrostrictive actuator, it is short-circuited. Therefore, effective pilot injection can be performed, and the injection rate thereof can be precisely controlled.

The drive circuit 100~100D detect the pressure of the pump chamber 602 in accordance with the output voltage from the electrostrictive actuator 200 generated based upon the pressure of the pump chamber 602, and controls the electrostrictive actuator 200 accordingly. For this reason, the injection rate control device 7 can be precisely controlled at a predetermined timing in accordance with the pressure of the pump chamber 602 without providing a separate pressure detecting means.

A pressure sensor comprising a strain gauge can be utilized as a detecting means for detecting the pressure of the pump chamber. Control of the electrostrictive actuator can be easily performed by those skilled in the art in such a manner that a desired timing is calculated in accordance with a signal generated from a rotation sensor using an MRE and the like other than the pressure of the pump chamber.

The present invention is not limited to the electrostrictive actuators described in the above embodiments. Various elements having electrostrictive characteristics extended/constricted by applying a voltage can be used.

In the above embodiment, the variable volume chamber 726 which changes its volume by the electrostrictive actuator 200 directly communicates with the pump chamber 602 which is compressed by the plunger. However, the variable volume chamber 726 can communicate with the distribution path 614 communicating with the pump chamber 602.

When the electrostrictive actuator is constricted, it is short-circuited by the control circuit. This is to compensate for any degradation in the durability of electrostrictive elements and extension/constriction characteristics. In general, when a voltage is applied to the electrostatic elements in a direction opposite to a polarization direction thereof, polarization is disturbed or is degraded. For this reason, the electrostrictive actuator is short-circuited to be constricted. However, the electrostrictive actuator can be constricted by applying a voltage in a direction opposite to the polarization direction thereof.

Embodiment shown in FIG. 38

FIG. 38 shows a fuel injection valve 69 in the fuel injection device using an electrostrictive actuator device according to still another embodiment of the present invention.

Referring to FIG. 38, an injection valve 69 is constituted by a nozzle complete 6901, a distance piece 6902, a nozzle holder 6903, a retaining nut 6904, a pressure pin 6905, and a spring 6906, and the nozzle complete 6901 is constituted by a nozzle body 6907 and a nozzle needle 6908.

The injection valve 69 is of a general-purpose type except that a check valve 6910 is provided at a fuel inlet port 6909 of the nozzle holder 6903. An injection steel pipe is coupled to the fuel inlet port 6909 of the nozzle holder 6903 in the same manner as in a conventional method. In this method, the injection steel pipe 68 has a large-diameter portion 6911, and the large-diameter portion 6911 is pressed by a cap nut 6933 through a sleeve 6912 to be brought into contact with a recessed portion 6934 formed in a distal end portion of the fuel inlet port 6909. The inlet port has a male threaded portion 6915 for meshing with the cap nut 6933.

The check valve 6910 in the above arrangement will be described in more detail.

A cylindrical valve chamber 6917 provided in inlet port 6909 communicates with a fuel path 6916 connected to the nozzle complete 6901 and having a diameter larger than that of the fuel path 6916. The valve chamber 6917 has an opening in the recessed portion 6934 at the distal end of the inlet port 6909. The valve chamber 6917 has a coil spring 6918 and a ball 6919. The coil spring 6918 biases the ball 6919 as a valve ball against an open end portion 6920 of the injection steel pipe 68 as a valve seat.

The valve ball 6919 is a precision steel ball, and the valve seat 6920 is formed into a conical shape and its surface has large surface roughness. Since the valve seat 6920 has large roughness, even if the valve ball 6919 is brought into tight contact with the valve seat 6920, the check valve 6910 has a path area corresponding to a 0.3-mm diameter remaining. A biasing force of the coil spring 6918 is set to be relatively large, so that only when a pressure difference before and after the coil spring 6918 becomes 40 kg/cm$^2$, the valve ball 6919 is separated from the valve seat 6920.

The operation and effect of the injection control device 7 and the injection valve 69 will be described with reference to FIG. 43.

Figure 39:
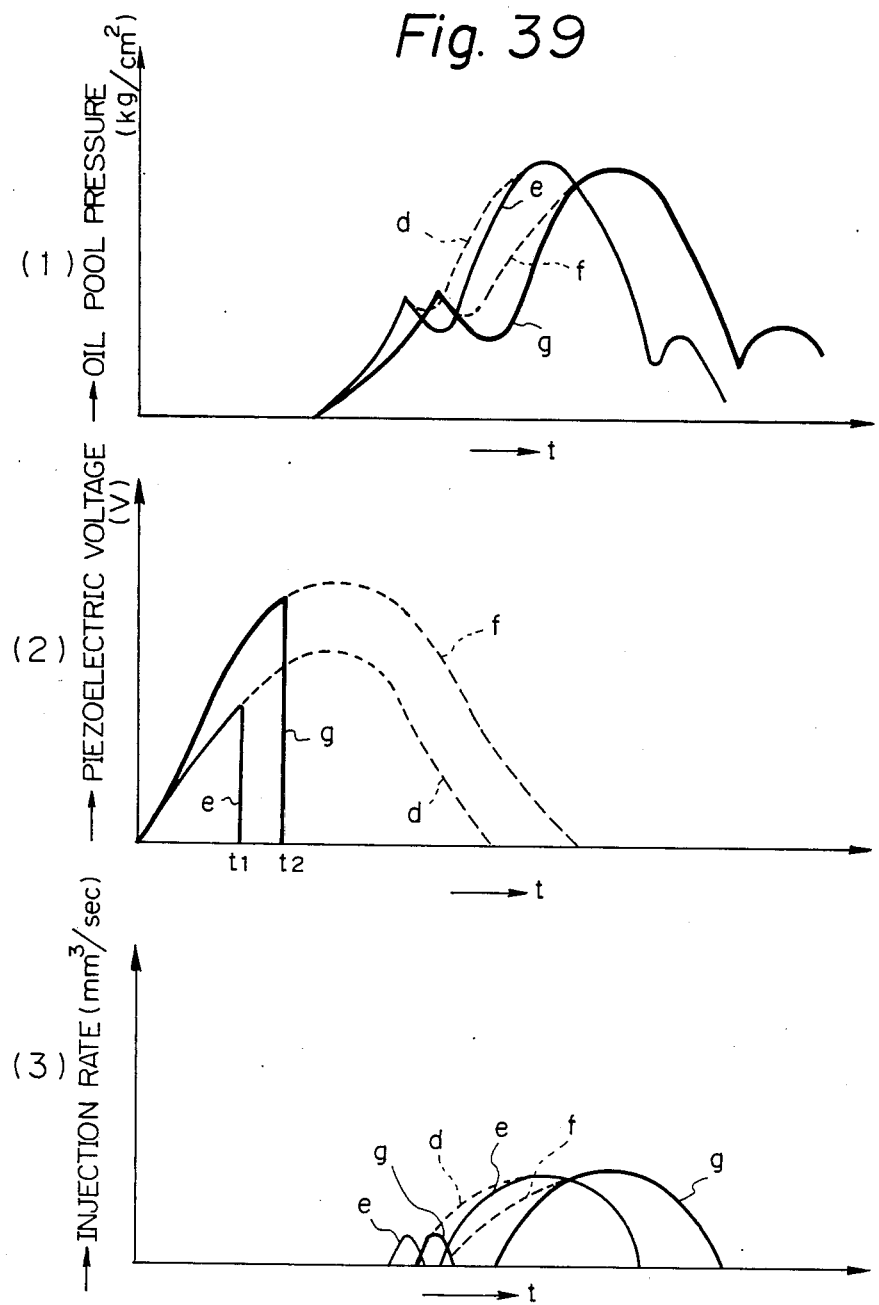
FIG. 39 is a graph showing the operational characteristics of the device shown in FIG. 38.

Referring to FIGS. 39(1), 39(2), and 39(3), the abscissa indicates time, and the ordinate of (1) indicates a pressure of an oil pool 6921; the ordinate of (2) represents a piezoelectric voltage generated in the electrostrictive actuator; and the ordinate of (3) represents an injection rate of the injection valve 69. Note that the oil pool 6921 is a chamber obtained by expanding a portion of a fuel path 6916 of the injection valve 69 nearest an injection port 6922, and is always provided in the normal nozzle body 6907. The injection rate expresses a flow amount of fuel externally injected from the injection port 6922 in unit time.

In FIGS. 39(1), 39(2), and 39(3), fine curves d and e are characteristics when a conventional injection valve having no valve ball 6919 is used. The dotted curve d indicates a case wherein the injection rate control device 7 is not operated and the fine solid curve e indicates a case wherein the injection rate control device 7 is operated and the electrostrictive actuator 200 is short-circuited, thus performing pilot injection. Curves f and g are characteristics when the injection valve 69 having the check valve 6910 is used. The broken line curve f indicates a case wherein the injection rate control device 7 is not operated and the solid line curve g indicates a case wherein the injection rate control device is operated and pilot injection is performed.

Cases will be described wherein the injection rate control device is enabled and disabled will be described.

When no external voltage is applied to the electrostrictive actuator 200, or the actuator 200 is not short-circuited, i.e., when the injection rate control device 7 is not operated, the pump chamber is subjected to a pressure exhaust step, and the pressures of the pump chamber 602 and the oil pool 6921 become as indicated by the broken line curves d and f in FIG. 39(1). Note that in the pressure exhaust step, the plunger 606 moves and the spill port 617 is covered by the spill ring 618.

Although the electrostrictive actuator 200 is not positively constricted, since it is slightly constricted by the fuel pressure of the pump chamber 602, the volume of the variable volume chamber 726 is slightly expanded. As a result, the pressures of the pump chamber 2 and the oil pool 6921 are slightly decreased.

When the electrostrictive actuator 200 is short-circuited, i.e., when the injection rate control device 7 is operated, the electrostrictive actuator 200 receives a load due to the fuel pressure so as to discharge an electric charge therein, and is immediately constricted. Thus, the variable volume chamber 726 is expanded, and the pressures of the pump chamber 602 and the oil pool 6921 are decreased. Therefore, the pressure is further decreased as indicated by the solid line curves e and g from the state indicated by the broken line curves d and f.

The injection valve 69 having the check valve 6910 (curves f and g) will be described as compared with the injection valve having no check valve (conventional injection valve) (curves d and e).

In the injection valve 69, the pressure of the oil pool 6921 is moderately increased as indicated by the curve f in FIG. 39(1). This is because when the fuel supplied through the injection steel pipe 68 due to pressure flows in the injection valve 69, a path area is reduced by the check valve 6910. Similarly, a fuel injection time of the injection valve (the curve f) is longer than that of the conventional valve (the curve d), as shown in FIG. 39(3). Therefore, an injection start timing of the device shown in FIG. 38 is delayed as compared to the conventional device. As a result, the pressure of the injection pump of the device shown in FIG. 38 becomes higher than that of the conventional device unlike FIG. 39(1). The pressure of the pump chamber 602 appears as a piezoelectric voltage generated in the electrostrictive actuator 200, as shown in FIG. 39(2). That is, the device shown in FIG. 38 has the higher piezoelectric voltage and a longer voltage generation period in comparison to the conventional injection valve.

When the piezoelectric voltage is short-circuited and the pressure of the pump chamber 2 is temporarily reduced to realize pilot injection, a short-circuiting timing of the device shown in FIG. 38 (the curve f) having a delayed rising timing of the oil pool is delayed as compared with the conventional injection valve (the curve d). Note that referring to FIG. 39(2), reference symbol $t_1$ denotes the short-circuiting timing of the conventional injection valve; and $t_2$, the short-circuiting timing of the device shown in FIG. 38. At the same timing $t_1$, the piezoelectric voltage of the device shown in FIG. 38 is higher than that of the conventional injection valve. Since the timing $t_2$ is delayed from the conventional timing $t_1$, the piezoelectric voltage of the device shown in FIG. 38 at the timing $t_2$ becomes still higher. Therefore, a constriction amount of the electrostrictive actuator 200 in the device shown in FIG. 38 is larger than that of the conventional injection valve. As a result, in the case of pilot injection, i.e., when the injection rate control device is operated, decreases in the pressures of the pump chamber and the oil pool in the device shown in FIG. 38 (the curve g) become larger than those of the conventional injection valve (the curve e).

Therefore, as shown in FIG. 39(3), when pilot injection is performed using the injection valve of the device shown in FIG. 38 (the curve g), the injection standby interval between the pilot injection and the main injection becomes longer, i.e., the effective pilot injection can be performed as compared to the case wherein the pilot injection is performed using the conventional injection valve (the curve e).

Note that when the injection ends, the delivery valve 615 performs retracting operation so as to immediately reduce the fuel pressure in the injection steel pipe 68. In this case, the reduced pressure is transmitted to the oil pool 6921 through a gap corresponding to 0.3-mm diameter between the valve seat of the check valve 6910 and the valve 6919, thus preventing secondary injection.

In the case of starting the injection, when the fuel supply speed from the pump chamber is low, i.e., when the engine is driven at a low speed, the fuel is supplied to the oil pool through the gap between the valve seat 6920 of the check valve 6910 and the valve ball 6919. However, when the fuel supply speed from the pump chamber is high, i.e., when the engine is driven at a high speed, the valve ball 6919 is separated from the valve seat 6920 against the spring 6918, thus expanding the path area so as to allow easy supply of the fuel to the oil pool 6921.

In the device shown in FIG. 38, a minimum throttle path which can remain even when the delivery valve is closed is formed by the gap between the valve ball 6919 and the valve seat 6920. FIG. 40 shows an example wherein this path is formed in the valve ball 6919.

Referring to FIG. 40, a member 6923 is not a steel ball but a poppet. A path 6924 extending through the central axis of the valve poppet 6923, and a throttle 6925 is formed in a portion of the path 6924. A minimum throttle path area can remain by the throttle 6925. When a fuel supply amount from the pump chamber is large, the valve poppet 6923 is separated from the valve seat 6920, thus increasing the path area in accordance with the fuel supply amount in the same manner as the injection valve shown in FIG. 38.

We claim:

1. A fuel injection pump of the distributor type for a diesel engine using, for controlling the rate of injection, an electrostritive actuator device having an electrostrictive actuator and an electric circuit means, said electrostrictive actuator being positioned to be responsive to fuel pressure in a pump chamber of said pump, said electric circuit means comprising:

electric charge changing means for changing an electric charge of said electrostrictive actuator in the state of generation of an electric charge due to a force of the fuel pressure exerted on said electrostrictive actuator, and thereby constricting said electrostrictive actuator to stop a fuel injection; and electrical charging means for charging said electrostrictive actuator in the state of constriction due to the operation of said electric charge changing means when the force of the fuel pressure exerted on said electrostrictive actuator is reduced after the fuel injection, thereby extending said electrostrictive actuator.

2. A device for controlling an electrostrictive actuator provided in a fuel injection pump for a diesel engine in such a manner that fuel pressure of said fuel injection pump which repetitively increases and decreases in timed realtion with rotation of said diesel engine is exerted on said electrostrictive actuator as a physical force, comprising:

electric charge storage means for storing electric charges therein;

first switching means for conductively connecting said electrostrictive actuator to said electric charge storage means when turned on so that the electric charges generated by said electrostrictive actuator in response to a physical force applied thereto are transferred to said electric charge storage means to thereby constrict said electrostrictive actuator;

second switching means for conductively connecting said electric charge storage means to said electrostrictive actuator when turned on so that the electric charges stored in said electric charge storage means are transferred to said electrostrictive actuator to thereby expand said electrostrictive actuator; and timing control means for turning on said first switching means when the physical force applied to said electrostrictive actuator is increased and turning on said second switching means when said physical force is decreased, wherein said electrostrictive actuator is provided in a chamber communicated with a pump chamber of said fuel injection pump so that fuel pressure in said fuel chamber is redued for pilot fuel injection into said diesel engine when said electrostrictive actuator is constricted by the turning-on of said first switching means.

3. A control circuit for an electrostrictive actuator device arranged to receive a physical force from externally of said electorstrictive actuator device, comprising:

a capacitor, coupled to receive charges from and supply charges to, said electrostrictive actuator device;

first switching means, coupled between said electrostrictive actuator device and said capacitor for transferring charges generated in said electrostrictive actuator device in response to the physical force applied thereto to said capacitor so that said electrostrictive actuator device is constricted; and second switching means for charging said electrosrictive actuator device by returning charges in said capacitor to said electrostrictive actuator device after the constriction thereof so that the electrostrictive actuator device is extended and charge generated in said electrostrictive actuator device in response to the physical force is increased.

4. A device according to claim 3, wherein the timing of said change of the electric charge of said electrostrictive acutator is controlled on the basis of a detection of a voltage generated in said electrostrictive actuator.

5. A device according to claim 3, wherein said second switching means includes a diode connected in parallel with said electrostrictive actuator.

6. A device according to claim 3, wherein said charge transferring is carried out when the voltage of said electrostrictive actuator is higher than the voltage of said capacitor, and said returning charge is carried out when the voltage of said electrostrictive actuator is lower than the voltage of said capacitor.

7. A device according to claim 3, wherein a current limiting element is connected with each of said first and second switching means.

8. A device according to claim 3, wherein each of said first and second switching means include a thyristor.

9. A device according to claim 7, wherein said current limiting element is a coil having an inductance.

10. A device according to claim 3, wherein the capacitance of said capacitor is more than 3 times a capacitance of said electrostrictive actuator.

11. A device according to claim 3, wherein said electrostrictive actuator is subject to repetitive applications of a force caused by oil pressure of a jerk type oil pump.

12. A device according to claim 3, further comprising a third switching means discharging of the electric charge of said electrostrictive actuator being carried out by said third switching means at a third timing different from said first or second timing.

13. A fuel injection pump according to claim 1, wherein each of said electric charge changing means and said electric charging means includes a capacitor, the electric charge changing being carried out by transferring the electric charge from said electrostrictive actuator to said capacitor, the electric charging being carried out by returning the electric charge from said capacitor to said electrostrictive actuator.

14. A fuel injection pump according to claim 13, wherein the timing for causing the constriction of said electrostrictive actuator is controlled.

15. A fuel injection pump according to claim 1, further comprising a switching valve is provided between said fuel injection pump and said electrostrictive actuator, said switching valve being in a communication state to communicate said fuel injection pump and said electrostrictive actuator to control the rate of injection during a predetermined running period, while said switching valve being in non-communication state to interrupt the communication between said fuel injection pump and said electrostrictive actuator to prevent said electrostrictive actuator from the application of the fuel pressure of said fuel injection pump.

16. A fuel injection pump according to claim 13, further comprising a switching valve is provided between said fuel injection pump and said electrostrictive actuator, said switching valve being in a communication state to communicate said fuel injection pump and said electrostrictive actuator to control the rate of injection during a predetermined running period, while said switching valve being in a non-communication state to interrupt the communication between said fuel injection pump and said electrostrictive actuator to prevent said electrostrictive actuator from the application of the fuel pressure of said fuel injection pump.

17. A fuel injection pump according to claim 1, further comprising a check valve is provided in an injection valve for said fuel injection pump.

18. A fuel injection pump according to claim 13, wherein a check valve is provided in an injection valve for said fuel injection pump.

19. A device according to claim 2, wherein said electroc charge storage means includes a capacitor, and said timing control means includes:

comparator means for comparing a voltage generated by said electrostrictive actuator with a reference value and turning on said first switching means when the voltage of said electrostrictive actuator exceeds the reference value; and delay means for turning on said second switching means when a predetermined delay interval has elapsed after the turning-on of said first switching means.

20. A device according to claim 2, further comprising a diode connected in parallel with said electrostrictive actuator for short-circuiting a reverse voltage generated by said electrostrictive actuator when the physical force applied to said electrostrictive actuator is decreased.

21. A device according to claim 2, wherein each of said first and second switching means comprise a thryistor between said electric charge storage means and said electrostrictive actuator.

* * * * *